(12) United States Patent
Satoh et al.

(10) Patent No.: US 7,092,109 B2
(45) Date of Patent: Aug. 15, 2006

(54) POSITION/ORIENTATION MEASUREMENT METHOD, AND POSITION/ORIENTATION MEASUREMENT APPARATUS

(75) Inventors: Kiyohide Satoh, Kanagawa (JP); Shinji Uchiyama, Kanagawa (JP); Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 10/752,487

(22) Filed: Jan. 8, 2004

(65) Prior Publication Data

US 2004/0176925 A1 Sep. 9, 2004

(30) Foreign Application Priority Data

Jan. 10, 2003 (JP) ............................. 2003-004945
Sep. 16, 2003 (JP) ............................. 2003-323101

(51) Int. Cl.
*H04N 7/18* (2006.01)
(52) U.S. Cl. ...................... 356/620; 348/139; 348/169; 702/153
(58) Field of Classification Search ................ 356/601, 356/611, 620; 348/139, 169; 702/153
See application file for complete search history.

(56) References Cited

U.S. PATENT DOCUMENTS 5,727,093 A 3/1998 Uchiyama et al. .......... 382/294

(Continued)

FOREIGN PATENT DOCUMENTS

JP 09-323280 12/1997

OTHER PUBLICATIONS

R.M. Haralick, et al., "Review and Analysis Of Solutions Of The Three Point Perspective Pose Elimination Problem," International Journal of Computer Vision, vol. 13, No. 3, pp. 331-356, 1994.
D.G. Lowe, "Fitting Parameterized Three-Dimensional Models To Images," IEEE Transactions on PAMI, vol. 13, No. 5, pp. 441-450, 1991.
Takahashi, A., et al., "A High Accuracy Realtime 3D Measuring Method of Marker for VR Interface by Monocular Vision," 3D Image Conference '96 (1996), pp. 167-172 (in Japanese with English abstract).

*Primary Examiner*—Richard A. Rosenberger
(74) *Attorney, Agent, or Firm*—Fitzpatrick, Cella, Harper & Scinto

(57) ABSTRACT

A first error coordinate between the image coordinate of a first indicator, which is arranged on the real space and detected on a first image captured by a first image sensing unit, and the estimated image coordinate of the first indicator, which is estimated to be located on the first image in accordance with the position/orientation relationship between the first image sensing unit (with the position and orientation according to a previously calculated position/orientation parameter) and the first indicator, is calculated. On the other-hand, a second error coordinate between the image coordinate of a second indicator, which is arranged on the first image sensing unit and detected on a second image that includes the first image sensing unit, and the estimated image coordinate of the second indicator, which is estimated to be located on the second image in accordance with the position/orientation relationship between the first image sensing unit (with the position and orientation according to the position/orientation parameter), and the second indicator, is calculated. Using the first and second error coordinates, the position/orientation parameter is corrected.

17 Claims, 13 Drawing Sheets

U.S. PATENT DOCUMENTS

| | | | |
|---|---|---|---|
| 5,889,550 A * | 3/1999 | Reynolds | 348/139 |
| 5,969,725 A | 10/1999 | Fujiki et al. | 345/433 |
| 6,292,215 B1 * | 9/2001 | Vincent | 348/169 |
| 2002/0103617 A1 | 8/2002 | Uchlyama et al. | 702/150 |
| 2003/0080975 A1 | 5/2003 | Kuroki et al. | 345/629 |
| 2003/0080976 A1 | 5/2003 | Satoh et al. | 345/629 |
| 2003/0144813 A1 | 7/2003 | Takemoto et al. | 702/153 |
| 2003/0182072 A1 | 9/2003 | Satoh et al. | 702/95 |

\* cited by examiner

POSITION/ORIENTATION MEASUREMENT METHOD, AND POSITION/ORIENTATION MEASUREMENT APPARATUS

FIELD OF THE INVENTION

The present invention relates to a technique for measuring the position and orientation of an image sensing device or an object that mounts the image sensing device.

BACKGROUND OF THE INVENTION

In recent years, studies about mixed reality that aims at seamless joint of real and virtual spaces have been extensively made. An image display apparatus that presents mixed reality is implemented by a video see-through system which superimposes and renders an image of a virtual space (e.g., virtual objects, text information, and the like rendered by computer graphics) generated in correspondence with the position and orientation of an image sensing device such as a video camera or the like on a real space image captured by the image sensing device, and displays these images.

In addition, the image display apparatus is implemented by an optical see-through system which displays a virtual space image generated in correspondence with the position and orientation of a viewpoint of an observer on an optical see-through display mounted on the observer's head.

As applications of such image display apparatus, new fields different from conventional virtual reality such as operation assistance that superimposes the state in a body onto the body surface of a patient, a mixed reality game in which a player fights against virtual enemies that swim on the real space, and the like are expected.

A common requirement for these applications involves the precision level of alignment between the real and virtual spaces, and many efforts have been conventionally made in this respect. A problem of alignment in mixed reality amounts to obtaining the position and orientation of an image sensing device in a scene (i.e., on a world coordinate system) in case of the video see-through system. Likewise, such problem amounts to obtaining the position and orientation of the viewpoint of the observer or display in a scene in case of the optical see-through system.

As a method of solving the former problem, it is a common practice to obtain the position and orientation of the image sensing device in the scene by laying out or setting a plurality of indicators in the scene, and detecting the coordinates of projected images of the indicators in an image captured by the image sensing device. As a method of solving the latter problem, it is a common practice to mount an image sensing device on an object to be measured (i.e., the observer's head or display), measure the position and orientation of the image sensing device by the same method as in the former method, and obtain the position and orientation of the object to be measured on the basis of the position and orientation of the image sensing device.

A conventional position/orientation measurement apparatus which measures the position and orientation of an image sensing device by detecting indicators from an image captured by the image sensing device will be explained below using FIG. 1. FIG. 1 is a diagram showing the arrangement of the conventional position/orientation measurement apparatus. As shown in FIG. 1, a conventional position/orientation measurement apparatus 100 comprises a subjective viewpoint indicator detection unit 110 and position/orientation calculation unit 120, and is connected to an image sensing device 130.

At a plurality of positions on a real space, a plurality of subjective viewpoint indicators $Q^k$ ($k=1, \ldots, K_1$) whose positions on a world coordinate system (a coordinate system specified by defining one point on the real space as an origin, and defining three orthogonal axes as the X-, Y-, and Z-axes) are known are laid out as indicators (to be referred to as subjective viewpoint indicators) to be captured by the image sensing device 130. The subjective viewpoint indicators $Q^k$ are preferably set so that at least three indicators are always observed on an image captured by the image sensing device 130 when the image sensing device 130 is located at respective points within the measurement range in which the position and orientation are to be measured. In the example shown in FIG. 1, four subjective viewpoint indicators $Q^1$, $Q^2$, $Q^3$, and $Q^4$ are laid out, and three indicators $Q^1$, $Q^3$, and $Q^4$ of them are included in the field of view of the image sensing device 130.

The subjective viewpoint indicators $Q^k$ may comprise circular markers having different colors, or feature points such as natural features or the like having different texture features. However, the indicators to be used are not particularly limited as long as the image coordinates of projected images on a captured image can be detected, and the indicators can be identified from each other.

An image (to be referred to as a subjective viewpoint image hereinafter) output from the image sensing device 130 is input to the position/orientation measurement apparatus 100.

The subjective viewpoint indicator detection unit 110 receives the subjective viewpoint image from the image sensing device 130, and detects the image coordinates of the subjective viewpoint indicators $Q^k$ that appear in the input image. For example, when the subjective viewpoint indicators $Q^k$ comprise markers having different colors, regions corresponding to respective marker colors are detected from the subjective viewpoint image, and their barycentric positions are detected as the detected coordinates of the indicators. On the other hand, when the subjective viewpoint indicators $Q^k$ comprise feature points having different texture features, template matching using template images of the respective indicators, which are held as known information, is applied to the subjective viewpoint image, thereby detecting the positions of indicators.

Furthermore, the subjective viewpoint indicator detection unit 110 outputs an image coordinate $u^{Q^{kn}}$ and identifier $k_n$ of each detected subjective viewpoint indicator $Q^{kn}$ to the position/orientation calculation unit 120. Note that n ($n=1, \ldots, N$) is an index corresponding to each detected indicator, and N is the total number of detected indicators. For example, in case of FIG. 1, N=3, and identifiers $k_1=1$, $k_2=3$, and $k_3=4$, and corresponding image coordinates $u^{Q^{k1}}$, $u^{Q^{k2}}$, and $u^{Q^{k3}}$ are output.

The position/orientation calculation unit 120 calculates the position and orientation of the image sensing device 130 on the basis of the relationship between the image coordinates $u^{Q^{kn}}$ of the detected subjective viewpoint indicators $Q^{kn}$ and world coordinates $x_W^{Q^{kn}}$ of the indicators held in advance as known information.

The method of calculating the position and orientation of an image sensing device from the sets of world and image coordinates of subjective viewpoint indicators has been proposed as a long-established method in the field of phototopography and the like (e.g., see R. M. Haralick, C. Lee, K. Ottenberg, and M. Nolle: Review and analysis of solutions of the three point perspective pose estimation problem, International Journal of Computer Vision, vol. 13, no. 3, pp. 331–356, 1994. , and D. G. Lowe: Fitting parameterized three-dimensional models to images, IEEE Transactions on PAMI, vol. 13, no. 5, pp. 441–450, 1991.).

The process executed by the position/orientation calculation unit 120 of this prior art will be explained below using the flow chart of FIG. 2. In this prior art, the position and orientation of the image sensing device is calculated by a numerical calculation scheme based on recursive arithmetic operations.

The position/orientation calculation unit 120 internally expresses the position and orientation to be calculated of the image sensing device 130 as three-valued vectors $[x\ y\ z]^T$ and $[\xi\ \psi\ \zeta]^T$. Various methods of expressing the orientation by three values are available. In this case, the orientation is expressed by a three-valued vector that expresses the rotation angle by its size, and the rotation axis direction by its direction. At this time, unknown parameters to be calculated are described by a six-valued state vector $s=[x\ y\ z\ \xi\ \psi\ \zeta]^T$.

In step S2000, the position/orientation calculation unit 120 sets an appropriate initial value (estimated values of the position and orientation) in the state vector s. For example, s derived in the process of the previous frame (time $t_{k-1}$) may be used as the initial value, or a value predicted based on a change in derived value from old "s"s may be set.

In step S2010, the position/orientation calculation unit 120 receives the actually measured values $u^{Q_{kn}}$ of the image coordinates and identifiers $k_n$ of the respective subjective viewpoint indicators $Q^{kn}$ detected by the subjective viewpoint indicator detection unit 110.

In step S2020, the position/orientation calculation unit 120 calculates estimated values $u^{Q_{kn}*}$ of the image coordinates of the respective subjective viewpoint indicators $Q^{kn}$. The calculation of $u^{Q_{kn}*}$ is made based on a function of the world coordinates $x_W^{Q_{kn}}$ of indicators $Q^{kn}$ held as known information and the current state vector s:

$$u^{Q_{k_n}*} = F_C\left(x_W^{Q_{k_n}}, s\right) \quad (1)$$

More specifically, the function $F_C(\ )$ comprises:

$$x_W^{Q_{k_n}} = \begin{bmatrix} x_C^{Q_{k_n}} & y_C^{Q_{k_n}} & z_C^{Q_{k_n}} & 1 \end{bmatrix} = M_{WC}(s)^{-1} \cdot x_W^{Q_{k_n}} \quad (2)$$

used to calculate a coordinate $x_C^{Q_{kn}}$ on a camera coordinate system (a coordinate system specified by defining one point on the camera as an origin and defining three orthogonal axes as X-, Y-, and Z-axes) of the indicator of interest from $x_W^{Q_{kn}}$ and s; and $$u^{Q_{k_n}*} = \begin{bmatrix} u_x^{Q_{k_n}*} & u_y^{Q_{k_n}*} \end{bmatrix}^T = -\begin{bmatrix} f_x^C \frac{x_C^{Q_{k_n}}}{z_C^{Q_{k_n}}} & -f_y^C \frac{y_C^{Q_{k_n}}}{z_C^{Q_{k_n}}} \end{bmatrix}^T \quad (3)$$

used to calculate the image coordinate $u^{Q_{kn}*}$ from the camera coordinate $x_C^{Q_{kn}}$.

Note that $f_x^C$ and $f_y^C$ are the focal lengths of the image sensing device 130 in the x- and y-axis directions, and are held as known values. Also, $M_{WC}(s)$ is a modeling conversion matrix (i.e., a matrix used to convert the coordinate on the camera coordinate system into that on the world coordinate system) determined by s, and is defined by:

$$M_{MC}(s) = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta & x \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta & y \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta & z \\ 0 & 0 & 0 & 1 \end{bmatrix} \quad (4)$$

for $\theta = \sqrt{\xi^2+\psi^2+\zeta^2}$.

In step S2030, the position/orientation calculation unit 120 calculates an error $\Delta u^{Q_{kn}}$ between the estimated value $u^{Q_{kn}*}$ and actually measured value $u^{Q_{kn}}$ of the image coordinate of each subjective viewpoint indicator $Q^{kn}$ by:

$$\Delta u^{Q_{k_n}} = u^{Q_{k_n}} - u^{Q_{k_n}*} \quad (5)$$

In step S2040, the position/orientation calculation unit 120 calculates, for each subjective viewpoint indicator $Q^{kn}$, a 2×6 Jacobian matrix $J_{us}^{Q_{kn}}(=\partial u/\partial s)$ having, as elements, solutions obtained by partially differentiating the function $F_C(\ )$ given by equation (1) by respective elements of the state vector s. More specifically, the unit 120 calculates a 2×3 Jacobian matrix $J_{ux}^{Q_{kn}}(=\partial u/\partial x)$ having, as elements, solutions obtained by partially differentiating the right-hand side of equation (3) by elements of the camera coordinate $x_C^{Q_{kn}}$, and a 3×6 Jacobian matrix $J_{xs}^{Q_{kn}}(=\partial x/\partial s)$ having, as elements, solutions obtained by partially differentiating the right-hand side of equation (2) by elements of the vector s, and then calculates $J_{us}^{Q_{kn}}$ by:

$$J_{us}^{Q_{k_n}} = J_{ux}^{Q_{k_n}} \cdot J_{xs}^{Q_{k_n}} \quad (6)$$

In step S2050, the position/orientation calculation unit 120 calculates a correction value $\Delta s$ of the state vector s on the basis of the errors $\Delta u^{Q_{kn}}$ and Jacobian matrices $J_{us}^{Q_{kn}}$ calculated in steps S2030 and S2040. More specifically, the unit 120 generates a (2N)-dimensional error vector:

$$U = \begin{bmatrix} \Delta u^{Q_{k_1}} \\ \vdots \\ \Delta u^{Q_{k_N}} \end{bmatrix} \quad (7)$$

by vertically lining up errors $\Delta u^{Q_{kn}}$, and a 2N×6 matrix:

$$\Phi = \begin{bmatrix} J_{us}^{Q_{k_1}} \\ \vdots \\ J_{us}^{Q_{k_N}} \end{bmatrix} \quad (8)$$

by vertically lining up Jacobian matrices $J_{us}^{Q_{kn}}$, and calculates the correction value $\Delta s$ using a pseudo inverse matrix $\Phi'$ of $\Phi$ by:

$$\Delta s = \Phi' U \quad (9)$$

Since N=3 in the example of FIG. 1, U is the six-dimensional vector, and $\Phi$ is the 6×6 matrix.

In step S2060, the position/orientation calculation unit 120 corrects the state vector s using the correction value $\Delta s$ calculated in step S2050 by:

$$s + \Delta s \rightarrow s \quad (10)$$

and sets the corrected value as a new estimated value of s.

The position/orientation calculation unit 120 determines in step S2070 whether or not the calculation converges using some determination criteria, i.e., whether or not error vector U is smaller than a predetermined threshold value, whether or not the correction value $\Delta s$ is smaller than a predetermined threshold value, and so forth. If the calculation does not converge, the unit 120 repeats the process in step S2020 and subsequent steps using the corrected state vector s.

In step S2080, the position/orientation calculation unit 120 outputs the obtained state vector s as the information of the position and orientation of the image sensing device 130. The information of the position and orientation is output in the form of, e.g., a viewing conversion matrix calculated from s.

In the conventional system, the position and orientation of the image sensing device 130 are acquired by the aforementioned method.

Also, the position and orientation of an object to be measured can also be calculated by setting a plurality of indicators on the object to be measured, capturing the object by an externally set objective viewpoint camera, and detecting image coordinates of projected images of the indicators in the captured objective viewpoint image (e.g., see D. G. Lowe: Fitting parameterized three-dimensional models to images, IEEE Transactions on PAMI, vol. 13, no. 5, pp. 441–450, 1991. , and Japanese Patent Laid-Open No. 09-323280).

However, with the former method that detects the indicators in the scene from the subjective viewpoint image obtained from the image sensing device as an object to be measured, since the moving amounts of the indicators on the image with respect to a change in position are smaller than those with respect to a change in orientation, sufficiently high position measurement precision cannot be obtained. In order to allow to look around over a broad range, many indicators must be set on the corresponding broad range region.

On the other hand, in the latter method that detects markers on an object to be measured from the objective viewpoint image obtained from the objective viewpoint camera, since the moving amounts of the indicators on the image with respect to a change in orientation are smaller than those with respect to a change in position, sufficiently high orientation measurement precision cannot be obtained.

SUMMARY OF THE INVENTION

The present invention has been made in consideration of the above problems, and has as its object to measure both the position and orientation of an object with high precision.

In order to achieve the object of the present invention, for example, a position/orientation measurement method according to the present invention has the following arrangement.

That is, there is provided a position/orientation measurement method for calculating a position and orientation of an object, comprising:

a subjective viewpoint image acquisition step of acquiring a first image obtained by capturing a scene by a subjective viewpoint image sensing unit attached to the object;

an objective viewpoint image acquisition step of acquiring a second image obtained by capturing an image of the object by an objective viewpoint image sensing unit;

a first detection step of detecting a feature value associated with an image coordinate of a first indicator arranged in the scene from the first image;

a second detection step of detecting a feature value associated with an image coordinate of a second indicator arranged on the object or the objective viewpoint image sensing unit from the second image; and a position/orientation calculation step of calculating the position and orientation of the object using the feature value associated with the image coordinate of the first indicator detected in the first detection step and the feature value associated with the image coordinate of the second indicator detected in the second detection step.

In order to achieve the object of the present invention, for example, a position/orientation measurement method according to the present invention has the following arrangement.

That is, there is provided a position/orientation measurement method of calculating a first position/orientation parameter of an object which is attached to a first image sensing unit used to capture an image of a real space, and has a known position/orientation relationship with the first image sensing unit, comprising:

a first image coordinate detection step of detecting an image coordinate of a first indicator arranged on the real space from a first image captured by the first image sensing unit;

a first estimated image coordinate detection step of calculating an estimated image coordinate of the first indicator in accordance with the position/orientation relationship between the first image sensing unit and the first indicator under an assumption that the position and orientation of the first image sensing unit follow a previously calculated second position/orientation parameter;

a first error coordinate calculation step of calculating a first error coordinate between the image coordinate detected in the first image coordinate detection step and the estimated image coordinate calculated in the first estimated image coordinate detection step on the first image;

a second image coordinate detection step of detecting an image coordinate of a second indicator arranged on the first image sensing unit or the object from a second image which is captured by a second image sensing unit and includes the object;

a second estimated image coordinate detection step of calculating an estimated image coordinate of the second indicator in accordance with the position/orientation relationship between the first image sensing unit and the second indicator under an assumption that the position and orientation of the first image sensing unit follow the previously calculated second position/orientation parameter;

a second error coordinate calculation step of calculating a second error coordinate between the image coordinate detected in the second image coordinate detection step and the estimated image coordinate calculated in the second estimated image coordinate detection step on the second image;

a correction value calculation step of calculating a correction value used to correct the previously calculated second position/orientation parameter using the first and second error coordinates;

a correction step of correcting the previously calculated second position/orientation parameter using the correction value; and a parameter calculation step of calculating the first position/orientation parameter of the object, which has the known position/orientation relationship with the first image sensing unit, using the second position/orientation parameter corrected in the correction step.

In order to achieve the object of the present invention, for example, a position/orientation measurement method according to the present invention has the following arrangement.

That is, there is provided a position/orientation measurement method of calculating a position and orientation of an image sensing device as an object to be measured, which captures an image of a scene, comprising:

a detection step of detecting a feature value associated with an image coordinate of a first indicator arranged in the scene from the image captured by the image sensing device;

a measurement step of measuring a position of a second indicator arranged on the image sensing device; and a position/orientation calculation step of calculating the position and orientation of the image sensing device using the feature value associated with the image coordinate of the first indicator detected in the detection step, and the position of the second indicator measured in the measurement step.

In order to achieve the object of the present invention, for example, a position/orientation measurement apparatus according to the present invention has the following arrangement.

That is, there is provided a position/orientation measurement apparatus for calculating a position and orientation of an object, comprising:

subjective image sensing unit, attached to the object, adapted to capture an image of a scene;

objective viewpoint image sensing unit adapted to capture an image of the object;

first detection unit adapted to detect a feature value associated with an image coordinate of a first indicator arranged in the scene from a first image captured by the subjective viewpoint image sensing unit;

second detection unit adapted to detect a feature value associated with an image coordinate of a second indicator arranged on the object or the subjective viewpoint image sensing unit from a second image captured by the objective viewpoint image sensing unit; and position/orientation calculation unit adapted to calculate the position and orientation of the object using the feature value associated with the image coordinate of the first indicator detected by the first detection unit, and the feature value associated with the image coordinate of the second indicator detected by the second detection unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

A position/orientation measurement apparatus according to this embodiment measures the position and orientation of an image sensing device. The position/orientation measurement apparatus and position/orientation measurement method according to this embodiment measures will be described hereinafter.

Figure 1:
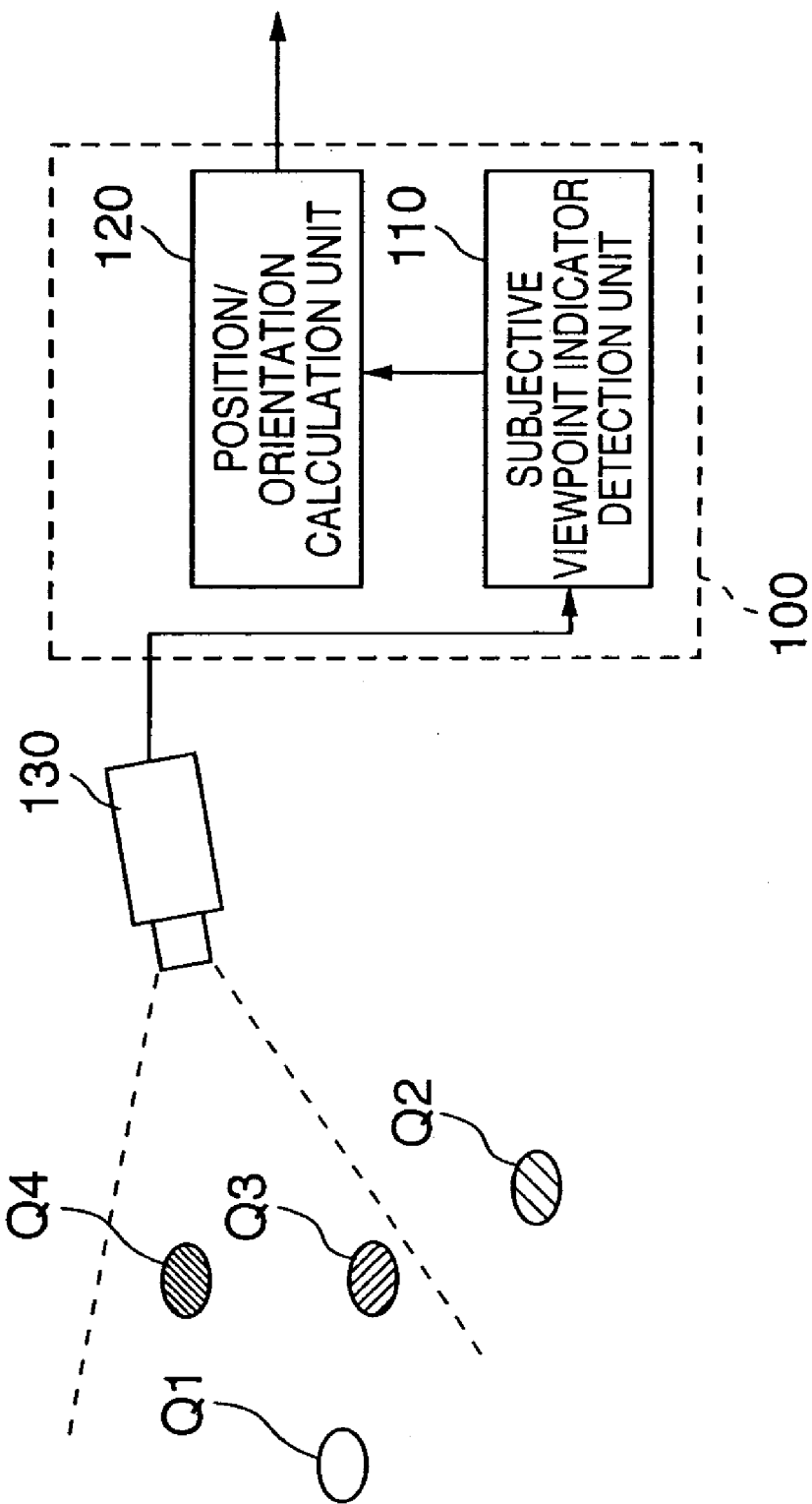
FIG. 1 is a diagram showing the arrangement of a conventional position/orientation measurement apparatus.
Figure 2:
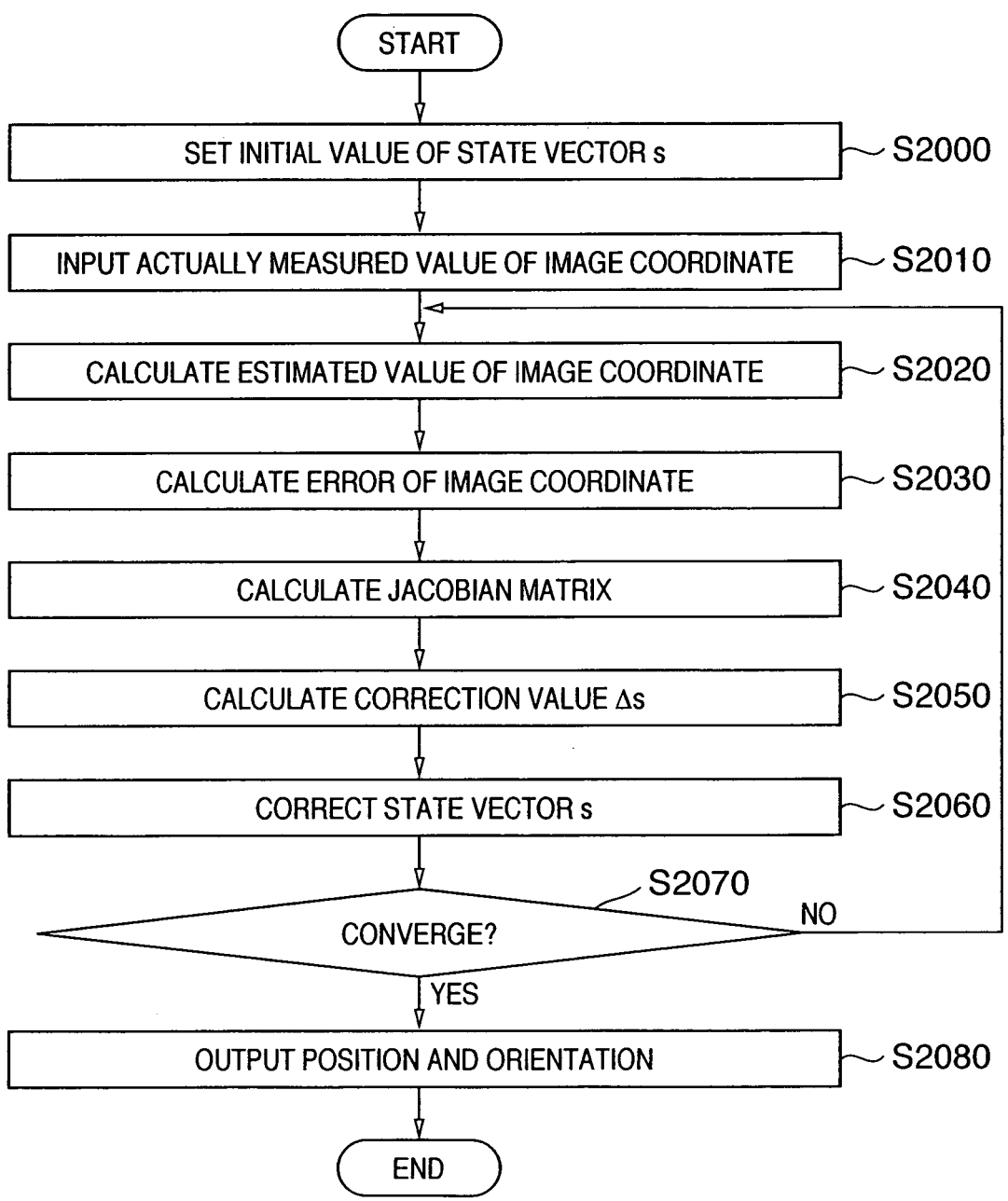
FIG. 2 is a flow chart showing the process to be executed by a position/orientation calculation unit 120 in the conventional apparatus.
Figure 3:
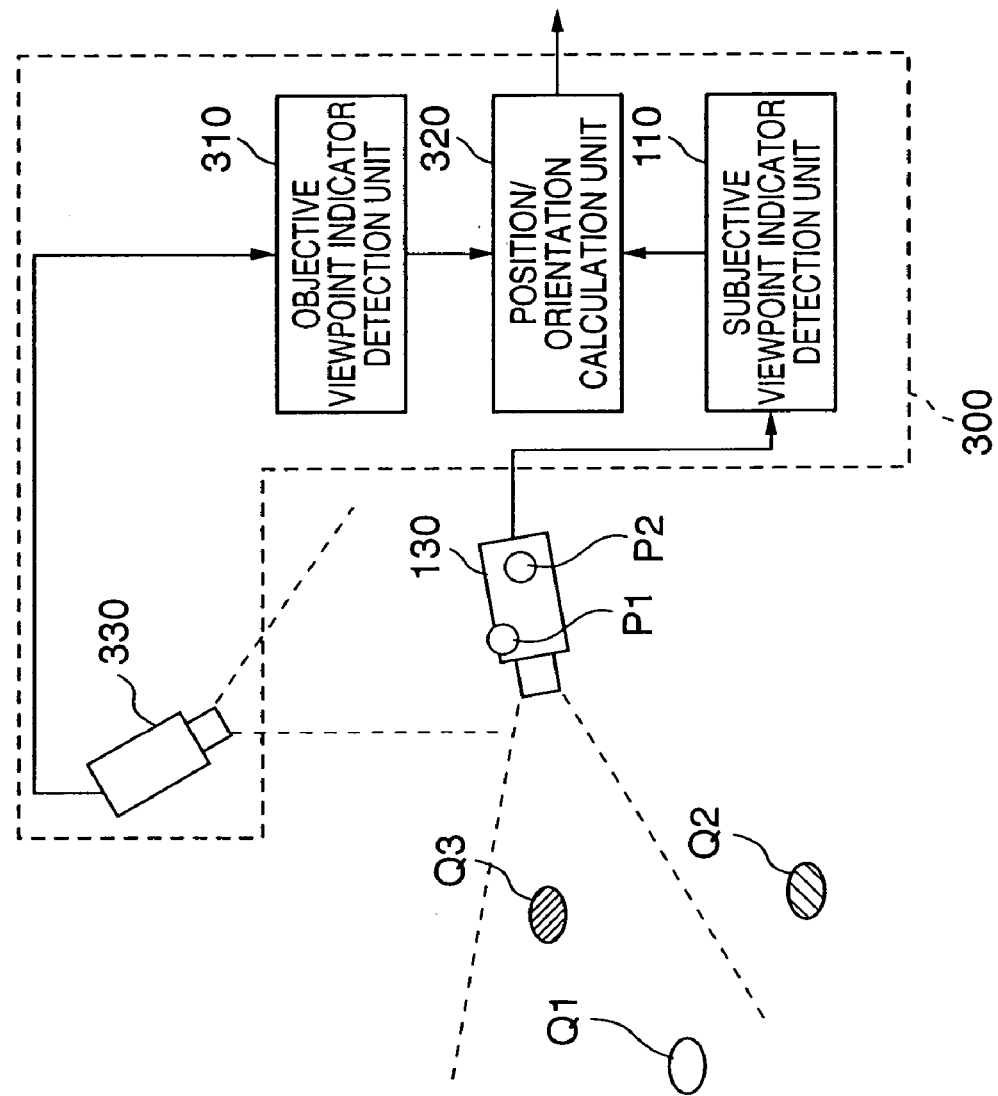
FIG. 3 is a schematic diagram showing the arrangement of a position/orientation measurement apparatus according to the first embodiment of the present invention.

FIG. 3 is a schematic diagram showing the arrangement of a position/orientation measurement apparatus according to this embodiment. Note that the same reference numerals and symbols in FIG. 3 denote the same parts as those in FIG. 1, and a description thereof will be omitted. As shown in FIG. 3, a position/orientation measurement apparatus 300 according to this embodiment comprises a subjective viewpoint indicator detection unit 110, objective viewpoint indicator detection unit 310, position/orientation calculation unit 320, and objective viewpoint camera 330, and is connected to an image sensing device 130 to be measured.

The objective viewpoint camera 330 is fixed at a position where it can capture an image of the image sensing device 130 when the image sensing device 130 is located within the measurement range. Assume that the position and orientation of the objective viewpoint camera 330 on the world coordinate system are held in advance in the objective viewpoint indicator detection unit 310 as known values.

At a plurality of positions on a real space, a plurality of subjective viewpoint indicators $Q^k$ whose positions on the world coordinate system are known are set as indicators to be captured by the image sensing device 130 as in the prior art. Also, at a plurality of positions on the image sensing device 130, objective viewpoint indicators $P^k$ (k=1, . . . , $K_2$) whose positions on a subjective viewpoint camera coordinate system (a coordinate system specified by defining one point on the image sensing device 130 as an origin, and defining three orthogonal axes as X-, Y-, and Z-axes) are known are set as indicators (to be referred to as objective viewpoint indicators) to be captured by the objective viewpoint camera 330.

These indicators are preferably set so that the total number of subjective viewpoint indicators observed on an image captured by the image sensing device, and objective viewpoint indicators observed on an image captured by the objective viewpoint camera 330 is at least three when the image sensing device 130 is located at respective points within the measurement range in which the position and orientation are to be measured. In the example of FIG. 3, three subjective viewpoint indicators Q1, Q2, and Q3, and two objective viewpoint indicators P1 and P2 are set, two subjective viewpoint indicators Q1 and Q3 of them are included in the field of view of the image sensing device 130, and the two objective viewpoint indicators P1 and P2 are included in the field of view of the objective viewpoint camera 330.

Note that the objective viewpoint indicators $p^k$ are not particularly limited as long as the image coordinates of projected images on a captured image can be detected, and the indicators can be identified from each other, as in the subjective viewpoint indicators $Q^k$. Also, both the subjective and objective viewpoint indicators may be deliberately set or may use, e.g., natural shapes, which are not deliberately set, as described above.

The subjective viewpoint indicator detection unit 110 receives a subjective viewpoint image captured by the image sensing device 130, detects the image coordinates of the subjective viewpoint indicators $Q^k$ that appear in the input image, and outputs image coordinates $u^{Qkn}$ and identifiers $k_n$ of the detected subjective viewpoint indicators $Q^{kn}$ to the position/orientation calculation unit 320, as in the prior art. In case of FIG. 3, since N=2, identifiers $k_1=1$ and $k_2=3$, and corresponding image coordinates $u^{Qk1}$ and $u^{Qk2}$ are output.

The objective viewpoint indicator detection unit 310 receives an image (to be referred to as an objective viewpoint image) captured by the objective viewpoint camera 330, detects the image coordinates of the objective viewpoint indicators $p^k$ that appear in the image by the same process as the subjective viewpoint indicator detection unit 110, and outputs image coordinates $u^{Pkm}$ and identifiers $k_m$ of the detected objective viewpoint indicators $P^{km}$ to the position/orientation calculation unit 320. Note that m (m=1, . . . , M) is an index assigned to each detected indicator, and M is the total number of detected indicators. For example, in case of FIG. 3, since M=2, identifiers $k_1=1$ and $k_2=2$, and corresponding image coordinates $u^{Pk1}$ and $u^{Pk2}$ are output.

The position/orientation calculation unit 320 calculates the position and orientation of the image sensing device 130 on the basis of the relationship between the image coordinates $u^{Qkn}$ of the detected subjective viewpoint indicators $Q^{kn}$ and world coordinates $x_W^{Qkn}$ of the indicators held in advance as known information, and the relationship between the image coordinates $u^{Pkm}$ of the detected objective viewpoint indicators $Q^{Pm}$ and positions $x_C^{Pkm}$ of the indicators on the objective viewpoint camera coordinate system held in advance as known information. In this way, the position and orientation of the image sensing device 130 can be measured.

Note that the objective viewpoint indicator detection unit 310, position/orientation calculation unit 320, and subjective viewpoint indicator detection unit 110 shown in FIG. 3 may be handled as independent devices, or their functions may be implemented by installing them as software programs in one or a plurality of computers and executing these programs by a CPU of each computer. In this embodiment, the respective units (objective viewpoint indicator detection unit 310, position/orientation calculation unit 320, and subjective viewpoint indicator detection unit 110) are handled as software programs which can run on a single computer.

Figure 10:
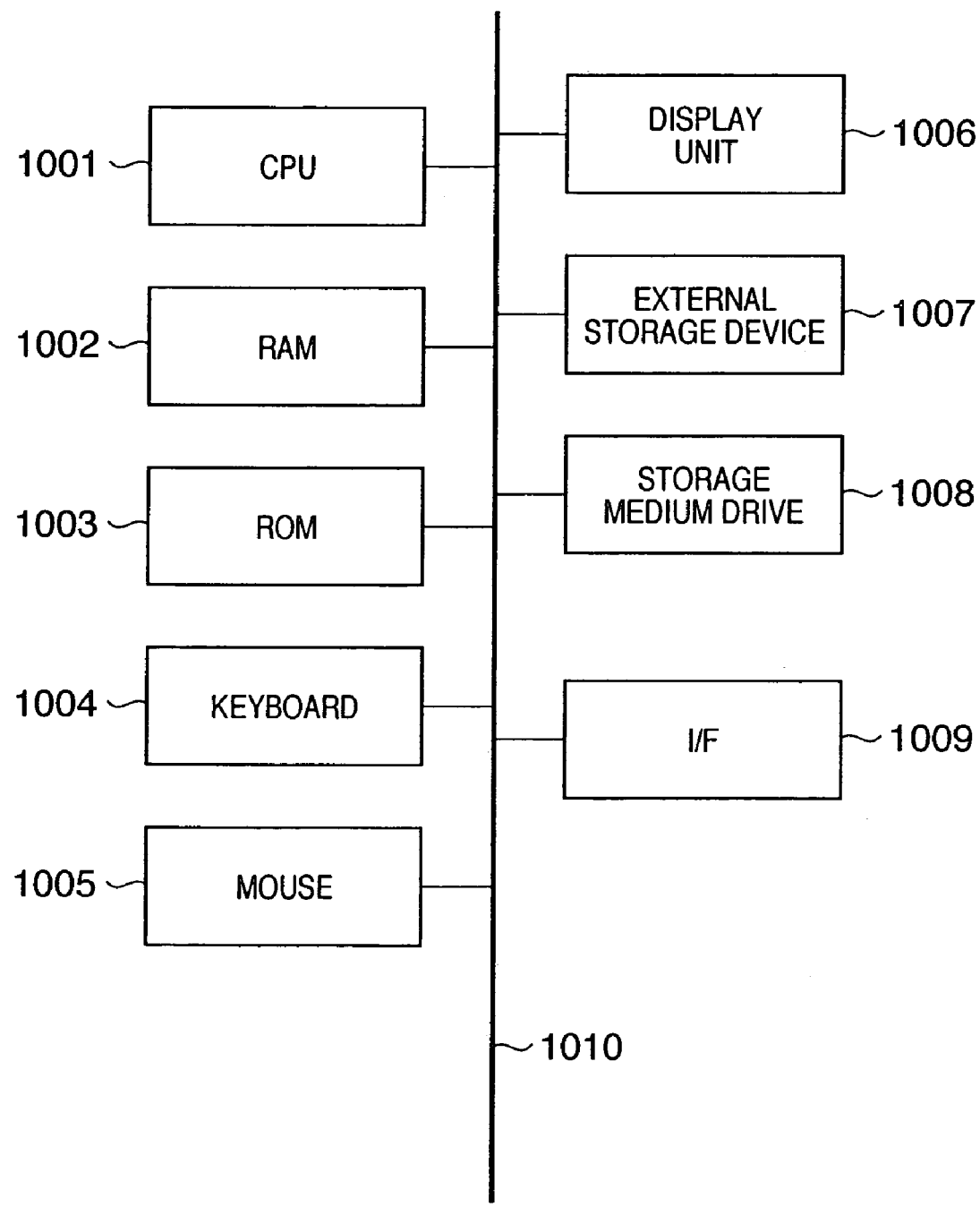
FIG. 10 is a block diagram showing the basic arrangement of a computer.

FIG. 10 is a block diagram showing the basic arrangement of a computer which executes the objective viewpoint indicator detection unit 310, position/orientation calculation unit 320, and subjective viewpoint indicator detection unit 110 as software programs.

Reference numeral 1001 denotes a CPU, which controls the overall computer using programs and data stored in a RAM 1002 and ROM 1003, and controls execution of the software programs of the objective viewpoint indicator detection unit 310, position/orientation calculation unit 320, and subjective viewpoint indicator detection unit 110 to implement the functions of these units.

The RAM 1002 comprises an area for temporarily storing programs and data loaded from an external storage device 1007 and storage medium drive 1008, and a work area required for the CPU 1001 to execute various processes.

The ROM 1003 normally stores a boot program, setup data, and the like of the computer. Reference numerals 1004 and 1005 respectively denote a keyboard and mouse. The operator can input various instructions to the CPU 1001 using these keyboard and mouse.

Reference numeral 1006 denotes a display unit, which comprises a CRT, liquid crystal display, and the like, and can display, e.g., messages and the like to be displayed for position/orientation measurement of the image sensing device 130.

The external storage device 1007 serves as a large-capacity information storage device such as a hard disk or the like, and saves an OS (operating system), software programs which respectively serve as the objective viewpoint indicator detection unit 310, position/orientation calculation unit 320, and subjective viewpoint indicator detection unit 110, and the like. Also, the device 1007 stores information described as known information in the description of this embodiment.

The storage medium drive 1008 reads out programs and data stored in a storage medium such as a CD-ROM, DVD-ROM, or the like in accordance with an instruction from the CPU 1001, and outputs them to the RAM 1002 and external storage device 1007.

Reference numeral 1009 denotes an I/F, which connects the image sensing device 130 and objective viewpoint camera 330. Images captured by these devices are fetched onto the RAM 1002 via the I/F 1009. Reference numeral 1010 denotes a bus which interconnects the above units.

Figure 4:
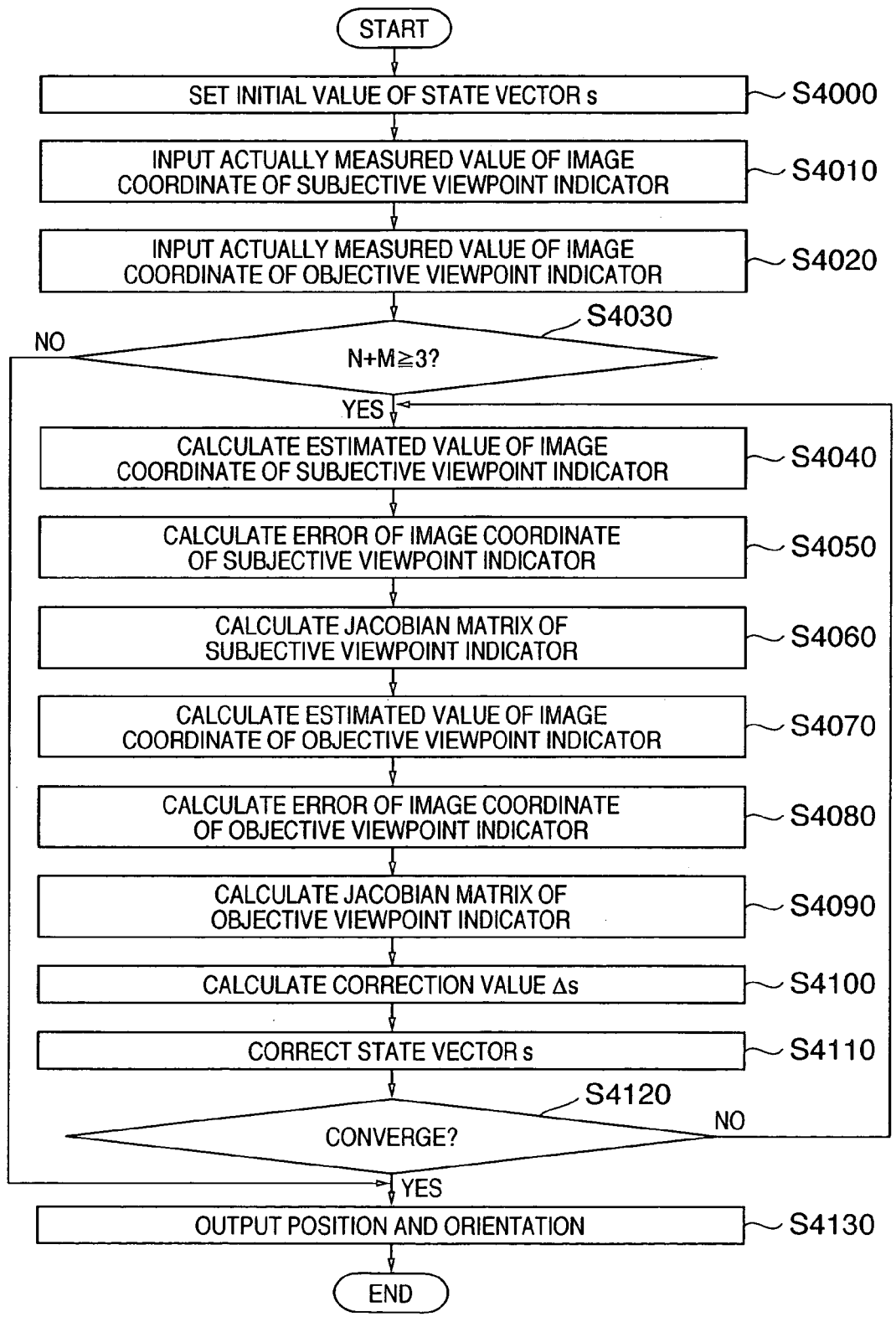
FIG. 4 is a flow chart showing the process for calculating parameters indicating the position and orientation of an image sensing device 130, which is implemented when a CPU 1001 executes a software program of a position/orientation calculation unit 320.

FIG. 4 is a flow chart showing the process for calculating parameters indicating the position and orientation of the image sensing device 130, which is implemented when the CPU 1001 executes a software program of the position/orientation calculation unit 320. Assume that the software programs of the objective viewpoint indicator detection unit 310, position/orientation calculation unit 320, and subjective viewpoint indicator detection unit 110 have already been loaded onto the RAM 1002 prior to the following process.

The position/orientation calculation unit 320 internally expresses the position and orientation to be calculated of the image sensing device 130 as three-valued vectors $[x\ y\ z]^T$ and $[\xi\ \psi\ \zeta]^T$ as in the position/orientation calculation unit 120 of the prior art. At this time, unknown parameters to be calculated are described by a six-valued state vector $s=[x\ y\ z\ \xi\ \psi\ \zeta]^T$.

In step S4000, the position/orientation calculation unit 320 sets an appropriate initial value (estimated values of the position and orientation) in the state vector s. For example, s derived in the process of the previous frame (time $t_{k-1}$) may be used as the initial value, or a value predicted based on a change in derived value from old "s"s may be set.

In step S4010, the position/orientation calculation unit 320 receives the image coordinates $u^{Qkn}$ and identifiers $k_n$ of the respective subjective viewpoint indicators $Q^{kn}$ detected by the subjective viewpoint indicator detection unit 110.

In step S4020, the position/orientation calculation unit 320 receives the image coordinates $u^{Pkm}$ and identifiers $k_m$ of the respective subjective viewpoint indicators $P^{km}$ detected by the subjective viewpoint indicator detection unit 110.

The position/orientation calculation unit 320 checks in step S4030 if the total number of input indicators (i.e., N+M) is 3 or more. If the total number of indicators is less than 3, the flow jumps to step S4130 while skipping an update process of s implemented in steps S4040 to S4120.

In step S4040, the position/orientation calculation unit 320 calculates estimated values $u^{Qkn*}$ of the image coordinates of the respective subjective viewpoint indicators $Q^{kn}$ on the basis of equations (1) to (4). That is, under the assumption that the position and orientation of the image sensing device 130 follow the previously calculated state vector s, the estimated values of the image coordinates of the respective subjective viewpoint indicators are calculated in accordance with the position/orientation relationship between the image sensing device 130 and subjective viewpoint indicators.

In step S4050, the position/orientation calculation unit 320 calculates an error $\Delta u^{Qkn}$ between the estimated value $u^{Qkn*}$ and actually measured value $u^{Qkn}$ of the image coordinate of each subjective viewpoint indicator $Q^{kn}$ on the basis of equation (5).

In step S4060, the position/orientation calculation unit 320 calculates, for each subjective viewpoint indicator $Q^{kn}$, a 2×6 Jacobian matrix $J_{us}^{Qkn}\ (=\partial u/\partial s)$ having, as elements, solutions obtained by partially differentiating the function $F_C(\ )$ given by equation (1) by respective elements of the state vector s, on the basis of equation (6).

In step S4070, the position/orientation calculation unit 320 calculates estimated values $u^{Pkm*}$ of the image coordinates of the respective objective viewpoint indicators $P^{km}$. That is, the position/orientation calculation unit 320 calculates the estimated values of the respective objective viewpoint indicators in accordance with the position/orientation relationship between the image sensing device 130 and objective viewpoint indicators, under the assumption that the position and orientation of the image sensing device 130 follow the previously calculated state vector s.

The calculation of $u^{Pkm*}$ is made based on a function of the camera coordinates (coordinate values on the camera coordinate system) $x_C^{Pkm}$ of indicators $P^{km}$ held as known information and the current state vector s:

$$u^{P_{k_m}*} = F_B\left(x_C^{P_{k_m}}, s\right) \quad (11)$$

More specifically, the function $F_B(\ )$ comprises:

$$x_B^{P_{k_m}} = \begin{bmatrix} x_B^{P_{k_m}} & y_B^{P_{k_m}} & z_B^{P_{k_m}} & 1 \end{bmatrix} = M_{WB}^{-1} \cdot M_{WC}(s) \cdot x_C^{P_{k_m}} \quad (12)$$

used to calculate a coordinate $x_B^{Pkm}$ on an objective viewpoint camera coordinate system (a coordinate system specified by defining one point on the objective viewpoint camera 330 as an origin and defining three orthogonal axes as X-, Y-, and Z-axes) of the indicator of interest from $x_C^{Pkm}$ and s; and $$u^{P_{k_m}*} = \begin{bmatrix} u_x^{P_{k_m}*} & u_y^{P_{k_m}*} \end{bmatrix}^T = \begin{bmatrix} -f_x^B \frac{x_B^{P_{k_m}}}{z_B^{P_{k_m}}} & -f_y^B \frac{y_B^{P_{k_m}}}{z_B^{P_{k_m}}} \end{bmatrix}^T \quad (13)$$

used to calculate the image coordinate $u^{Pkm*}$ from the camera coordinate $x_B^{Pkm}$.

Note that $f_x^B$ and $f_y^B$ are the focal lengths of the objective viewpoint camera 330 in the x- and y-axis directions, and are held as known values. Also, $M_{WB}$ is a conversion matrix used to convert the coordinate on the objective viewpoint camera coordinate system into that on the world coordinate system, and is calculated in advance on the basis of the position and orientation of the objective viewpoint camera 330 on the world coordinate system, which are held in advance as known value.

In step S4080, the position/orientation calculation unit 320 calculates an error $\Delta u^{Pkm}$ between the estimated value $u^{Pkm*}$ and actually measured value $u^{Pkm}$ of the image coordinate of each objective viewpoint indicator $P^{km}$ by:

$$\Delta u^{P_k m} = u^{P_k m} - u^{P_k m^*} \quad (14)$$

In step S4090, the position/orientation calculation unit 320 calculates, for each objective viewpoint indicator $P^{km}$, a 2×6 Jacobian matrix $J_{us}^{Pkm}(=\partial u/\partial s)$ having, as elements, solutions obtained by partially differentiating the function $F_B()$ given by equation (11) by respective elements of the state vector s, on the basis of equation (6). More specifically, the unit 320 calculates a 2×3 Jacobian matrix $J_{ux}^{Pkm}(=\partial u/\partial x)$ having, as elements, solutions obtained by partially differentiating the right-hand side of equation (13) by elements of the camera coordinate $x_B^{Pkm}$, and a 3×6 Jacobian matrix $J_{xs}^{Pkm}(=\partial x/\partial s)$ having, as elements, solutions obtained by partially differentiating the right-hand side of equation (12) by elements of the vector s, and then calculates $J_{us}^{Pkm}$ by:

$$J_{us}^{P_k m} = J_{ux}^{P_k m} \cdot J_{xs}^{P_k m} \quad (15)$$

In step S4100, the position/orientation calculation unit 320 specifies an error vector U and matrix $\Phi$ on the basis of the errors $\Delta u^{Qkn}$, Jacobian matrices $J_{us}^{Qkn}$, errors $\Delta u^{Pkm}$, and Jacobian matrices $J_{us}^{Pkm}$ calculated in the above steps, and calculates a correction value $\Delta s$ of the state vector s by equation (9). At this time, the error vector U is set as a 2(N+M)-dimensional vector:

$$U = \begin{bmatrix} \Delta u^{Q_k 1} \\ \vdots \\ \Delta u^{Q_k N} \\ \Delta u^{P_k 1} \\ \vdots \\ \Delta u^{P_k M} \end{bmatrix} \quad (16)$$

by vertically lining up the errors $\Delta u^{Qkn}$ and $\Delta u^{Pkm}$.

Also, the matrix $\Phi$ is set as a 2(N+m)×6 matrix:

$$\Phi = \begin{bmatrix} J_{us}^{Q_k 1} \\ \vdots \\ J_{us}^{Q_k N} \\ J_{us}^{P_k 1} \\ \vdots \\ J_{us}^{P_k M} \end{bmatrix} \quad (17)$$

by vertically lining up the Jacobian matrices $J_{us}^{Qkn}$ and $J_{us}^{Pkm}$. In the example of FIG. 3, since M=2 and N=2, U is an eight-dimensional vector, and $\Phi$ is a 8×6 matrix.

In step S4110, the position/orientation calculation unit 320 corrects the state vector s, i.e., parameters indicating the position and orientation of the image sensing device 130, using the correction value $\Delta s$ calculated in step S4100 by equation (10), and sets the corrected value as a new estimated value of s.

The position/orientation calculation unit 320 determines in step S4120 whether or not the calculation converges, using some determination criteria, i.e., whether or not error vector U is smaller than a predetermined threshold value, whether or not the correction value $\Delta s$ is smaller than a predetermined threshold value, and so forth. If the calculation does not converge, the unit 320 repeats the process in step S4040 and subsequent steps using the corrected state vector s.

If it is determined in step S4120 that the calculation converges, the position/orientation calculation unit 320 outputs the obtained state vector s as the parameters indicating the position and orientation of the image sensing device 130 in step S4130. As the parameters to be output, an Euler angle obtained by converting the orientation component of s may be output, or a viewing conversion matrix calculated from s may be output. In addition, various other position/orientation description methods may be used.

With the above process, the position and orientation of the image sensing device, which can minimize not only errors between neighboring indicators on the subjective viewpoint image but also those between neighboring indicators on the objective viewpoint image, can be obtained. In this way, the position and orientation of the image sensing device 130 can be measured with higher precision than that obtained using either one of the subjective and objective viewpoint images, and their parameters can be calculated.

As described above, both the position and orientation of the image sensing device can be measured with high precision.

In this embodiment, since both the subjective and objective viewpoint images are used, the total number of subjective viewpoint indicators to be set in a scene can be reduced compared to the conventional method that uses the subjective viewpoint image alone.

[Second Embodiment]

A position/orientation measurement apparatus according to this embodiment measures the positions and orientations of two cameras mounted on a stereo video see-through HMD (Head Mount Display). The position/orientation measurement apparatus and position/orientation measurement method according to this embodiment will be described hereinafter.

Figure 5:
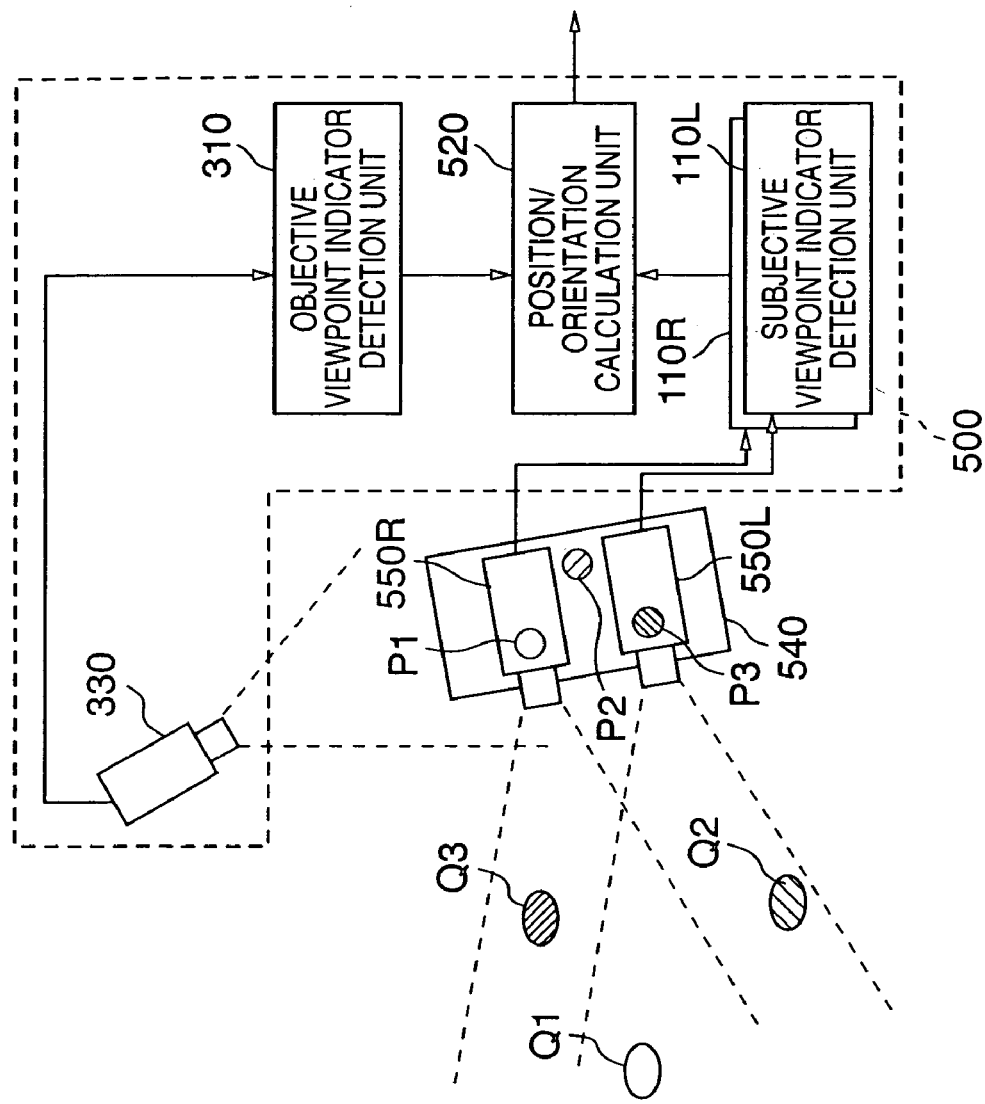
FIG. 5 is a schematic diagram showing the arrangement of a position/orientation measurement apparatus according to the second embodiment of the present invention.

FIG. 5 is a schematic diagram showing the arrangement of the position/orientation measurement apparatus according to this embodiment. Note that the same reference numerals and symbols in FIG. 5 denote the same parts as those in FIGS. 1 and 3. As shown in FIG. 5, a position/orientation measurement apparatus 500 according to this embodiment comprises subjective viewpoint indicator detection units 110R and 110L, objective viewpoint indicator detection unit 310, position/orientation calculation unit 520, and objective viewpoint camera 330.

Subjective viewpoint indicators $Q^k$ are laid out in the same manner as in the first embodiment, and the functions of the objective viewpoint camera 330 and objective viewpoint indicator detection unit 310 are the same as those in the first embodiment. Hence, a detailed description thereof will be omitted.

An HMD 540 incorporates two cameras 550R and 550L to capture videos of the real image corresponding to the right and left viewpoints of the observer. Assume that the position and orientation of the camera 550R on a left camera coordinate system (a coordinate system specified by defining one point on the camera 550L as an origin and defining three orthogonal axes as the X-, Y-, and Z-axes) are known. Also, objective viewpoint indicators $p^k$ (k=1, ..., K2) whose positions on the left camera coordinate system are known are set at a plurality of positions on the HMD 540.

Right and left subjective viewpoint images captured by the cameras 550R and 550L are respectively input to the subjective viewpoint indicator detection units 110R and 110L.

The subjective viewpoint indicator detection units 110R and 110L execute subjective viewpoint indicator detection processes of the right and left subjective viewpoint images input to them by the same process as that in the subjective viewpoint indicator detection unit 110 in the first embodiment, and output the image coordinates and identifiers of the detected indicators to the position/orientation calculation unit 520. In the following description, $u_R^{QkRn}$ and $u_L^{QkLn}$ respectively represent the image coordinates of the indicators detected by the subjective viewpoint indicator detection units 110R and 110L. Also, $N_R$ and $N_L$ respectively represent the total numbers of detected indicators.

In the example of FIG. 5, three subjective viewpoint indicators $Q^1$, $Q^2$, and $Q^3$ are laid out, and two subjective viewpoint indicators $Q^1$ and $Q^2$ of them are included in the field of view of the camera 550L, and two subjective viewpoint indicators $Q^1$ and $Q^3$ are included in the field of view of the camera 550R. At this time, since $N_L=2$, the subjective viewpoint indicator detection unit 110L outputs identifiers $k_{L1}=1$ and $k_{L2}=2$, and corresponding image coordinates $u^{QkL1}$ and $u^{QkL2}$. Likewise, since $N_R=2$, the subjective viewpoint indicator detection unit 110R outputs identifiers $k_{R1}=1$ and $k_{R3}=3$, and corresponding image coordinates $u^{QkR1}$ and $u^{QkR3}$.

The position/orientation calculation unit 520 calculates the positions and orientations of the two cameras 550R and 550L on the basis of the image coordinates $u^{QkRn}$ and $u^{QkLn}$ of the detected subjective viewpoint indicators $Q^{kn}$, and the image coordinates $u^{Pkm}$ of the objective viewpoint indicators $P^{km}$.

Note that the objective viewpoint indicator detection unit 310, position/orientation calculation unit 520, and subjective viewpoint indicator detection units 110R and 110L shown in FIG. 5 may be handled as independent devices, or their functions may be implemented by installing them as software programs in one or a plurality of computers and executing these programs by a CPU of each computer. In this embodiment, the respective units (objective viewpoint indicator detection unit 310, position/orientation calculation unit 520, and subjective viewpoint indicator detection units 110R and 110L) are handled as software programs which can run on a single computer. The basic arrangement of this computer is that shown in FIG. 10.

Also, in a description of this embodiment, all pieces of known information are saved in the external storage device 1007.

The processing sequence of the position/orientation calculation unit 520 is the same as that of the position/orientation calculation unit 320 in the first embodiment, and the unit 520 calculates a six-valued state vector s=[x y z ξ ψ ζ]$^T$ to have the position and orientation of the camera 550L as unknown parameters. However, since both the right and left detection results of the subjective viewpoint indicators are used, the process is different from the first embodiment in the following points.

That is, an error vector U is set as a 2($N_L+N_R+M$)-dimensional vector by vertically lining up errors $\Delta u_L^{QkLn}$, $\Delta u_R^{QkRn}$, and $\Delta u^{Pkm}$. Also, a matrix $\Phi$ is set as a 2($N_L+N_R+M$)×6 matrix by vertically lining up Jacobian matrices $J_{uLs}^{QkLn}$, $J_{uRs}^{QkRn}$, and $J_{us}^{Pkm}$. In the example of FIG. 5, since M=2, $N_L=2$, and $N_R=2$, U is a 12-dimensional vector, and $\Phi$ is a 12×6 matrix.

Note that the errors and Jacobian matrices associated with the subjective viewpoint indicators are calculated on the basis of unique parameters (focal lengths) of the cameras 550R and 550L by the same process as the calculations of the errors and Jacobian matrices associated with the subjective viewpoint indicators (steps S4040 to S4060) in the first embodiment. In this embodiment, as for the camera 550R, as an equation for calculating a coordinate $X_{CR}^{QkRn}$ of each indicator on a right camera coordinate system (a coordinate system specified by defining one point on the camera 550R as an origin, and defining three orthogonal axes as the X-, Y-, and Z-axes), equation (2) is replaced by:

$$x_{C_R}^{Q_kR_n} = M_{C_LC_R}^{-1} \cdot M_{WC_L}(s)^{-1} \cdot x_W^{Q_kR_n} \qquad (18)$$

where $M_{CLCR}$ is the conversion matrix from the right camera coordinate system to the left camera coordinate system, and is calculated in advance on the basis of the position and orientation of the camera 550R on the left camera coordinate system, which are held in advance as known values.

With the above equation, after s is calculated, the position and orientation of the camera 550R can be easily calculated using s and $M_{CLCR}$ as known values.

The outputs of the position/orientation measurement apparatus 500 of this embodiment may be viewing conversion matrices which indicate the positions and orientations of the cameras 550R and 550L, or may be two six-dimensional vectors which indicate the positions and orientations of the cameras 550R and 550L. When an apparatus (an image generation apparatus in case of this embodiment) which uses the outputs from the position/orientation measurement apparatus 500 holds the positional relationship (e.g., the aforementioned matrix $M_{CLCR}$) between the cameras 550R and 550L, only data indicating the position and orientation of one camera may be output.

As described above, both the positions and, orientations of the two cameras mounted on the stereo video see-through HMD can be measured with high precision.

[Third Embodiment]

The first embodiment uses one objective viewpoint camera. However, the number of objective viewpoint cameras is not limited to one. When a plurality of objective viewpoint cameras are used to form the position/orientation measurement apparatus, expansion of the measurement range and improvement of measurement stability are expected.

Figure 6:
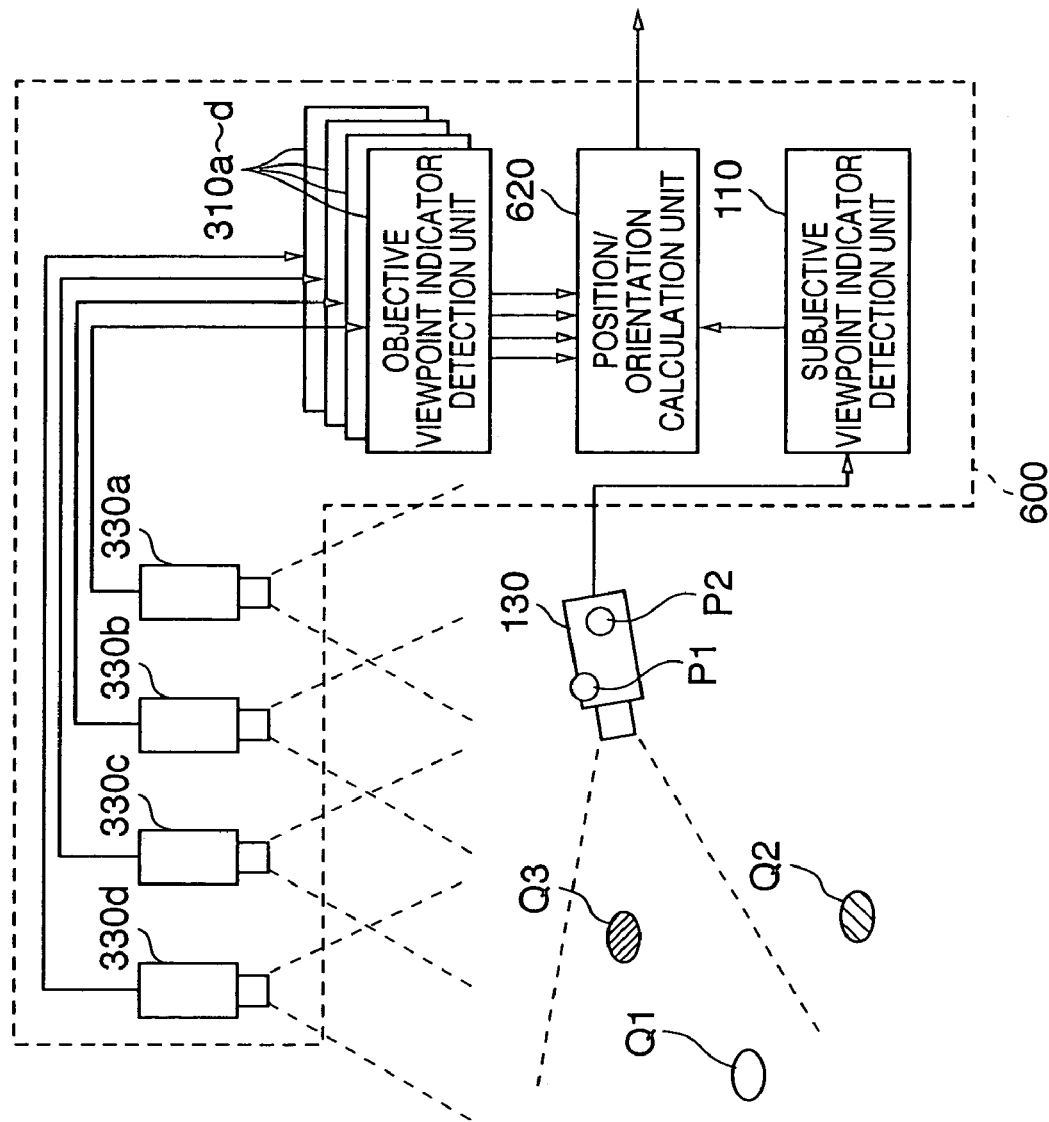
FIG. 6 is a schematic diagram showing the arrangement of a position/orientation measurement apparatus according to the third embodiment of the present invention.

FIG. 6 is a schematic diagram showing the arrangement of the position/orientation measurement apparatus according to this embodiment. Note that the same reference numerals and symbols in FIG. 6 denote the same parts as those in FIGS. 1 and 3. As shown in FIG. 6, a position/orientation measurement apparatus 600 according to this embodiment comprises objective viewpoint cameras 330a to 330d, objective viewpoint indicator detection units 310a to 310d, a subjective viewpoint indicator detection unit 110, and a position/orientation calculation unit 620.

Note that subjective and objective viewpoint indicators Q and P are laid out in the same manner as in the first embodiment, and a subjective viewpoint video captured by an image sensing device 130 is input to the subjective viewpoint indicator detection unit 110. Since the function of the subjective viewpoint indicator detection unit 110 is the same as that in the first embodiment, a description thereof will be omitted.

The objective viewpoint cameras 330a to 330d are fixed at positions where they can capture images of the image sensing device 130 when the image sensing device 130 is located within the measurement range. The layout of the objective viewpoint cameras 330a to 330d may be set so that the respective cameras capture regions which overlap each other to allow the objective viewpoint indicators P to be observed by a plurality of objective viewpoint cameras for the purpose of improvement of stability against occlusion, or may be set so that the respective cameras capture different regions for the purpose of expansion of the measurement range. Assume that the positions and orientations of the objective viewpoint cameras 330a to 330d on the world coordinate system are held in advance as known values.

The objective viewpoint indicator detection units 310a to 310d receive objective viewpoint images captured by the objective viewpoint cameras 330a to 330d, execute objective viewpoint indicator detection processes, and output the image coordinates and identifiers of the detected indicators to the position/orientation calculation unit 620 by the same process as that of the objective viewpoint indicator detection unit 310 in the first embodiment. In the following description, $u_a^{Pkan}$, $u_b^{Pkbn}$, $u_c^{Pkcn}$, and $u_d^{Pkdn}$ respectively represent image coordinates of indicators detected by the objective: viewpoint indicator detection units 310a to 310d. Also, $M_a$, $M_b$, $M_c$, and $M_d$ respectively indicate the total numbers of detected indicators.

The position/orientation calculation unit 620 calculates the position and orientation of the image sensing device 130 on the basis of the relationship between the image coordinates and world coordinates of the detected subjective viewpoint indicators, and the relationship between the image coordinates of the objective viewpoint indicators detected by the objective viewpoint indicator detection units 310a to 310d and their positions on the objective viewpoint camera coordinate system.

Note that the objective viewpoint indicator detection units 310a to 310d, subjective viewpoint indicator detection unit 110, and position/orientation calculation unit 620 shown in FIG. 6 may be handled as independent devices, or their functions may be implemented by installing them as software programs in one or a plurality of computers and executing these programs by a CPU of each computer. In this embodiment, the respective units (objective viewpoint indicator detection units 310a to 310d, subjective viewpoint indicator detection unit 110, and position/orientation calculation unit 620) are handled as software programs which can run on a single computer. The basic arrangement of this computer is that shown in FIG. 10.

Also, in a description of this embodiment, all pieces of known information are saved in the external storage device 1007.

The processing sequence of the position/orientation calculation unit 620 is the same as that of the position/orientation calculation unit 320 in the first embodiment, and the unit 520 calculates a six-valued state vector s=[x y z ξ ψ ζ]$^T$ to have the position and orientation of the image sensing device 130 as unknown parameters. However, since a plurality of objective viewpoint cameras are used, the process is different from the first embodiment in the following points.

That is, an error vector U is set as a 2(N+$M_a$+$M_b$+$M_c$+$M_d$)-dimensional vector by vertically lining up errors $\Delta u^{Qkn}$, $\Delta u_a^{Pkam}$, $\Delta u_b^{Pkbm}$, $\Delta u_c^{Pkcm}$, and $\Delta u_d^{Pkdm}$. Also, a matrix Φ is set as a 2(N+$M_a$+$M_b$+$M_c$+$M_d$)×6 matrix by vertically lining up Jacobian matrices $J_{us}^{Qkn}$, $J_{uas}^{Pkam}$, $J_{ubs}^{Pkbm}$, $J_{ucs}^{Pkcm}$, and $J_{uds}^{Pkdm}$. Note that the errors and Jacobian matrices associated with the subjective viewpoint indicators are calculated on the basis of unique parameters (positions on the world coordinate system and focal lengths) of the objective viewpoint cameras 330a to 330d by the same process as the calculations of the errors and Jacobian matrices associated with the subjective viewpoint indicators (steps S4040 to S4060) in the first embodiment.

As described above, since the plurality of objective viewpoint cameras are used, even when the image sensing devices moves over a broad range or the image sensing device is occluded with respect to the field of view of an arbitrary objective viewpoint camera, data that suffice to calculate the position and orientation of the image sensing device can be acquired, thus achieving expansion of the movable range and improvement of stability against occlusion or the like.

Note that the position/orientation measurement apparatus of this embodiment uses the four objective viewpoint cameras. However, the number of objective viewpoint cameras is not limited to four, and an arbitrary number of objective viewpoint cameras may be used.

[Fourth Embodiment]

The first to third embodiments aim at measuring the position and orientation of the image sensing device itself, which moves three-dimensionally. A position/orientation measurement apparatus according to this embodiment aims at measuring the position and orientation of an arbitrary object, and has an arrangement obtained by adding a camera that captures a subjective viewpoint image to the position/orientation measurement apparatus of the first embodiment. The position/orientation measurement apparatus and position/orientation measurement method according to this embodiment will be described hereinafter.

Figure 7:
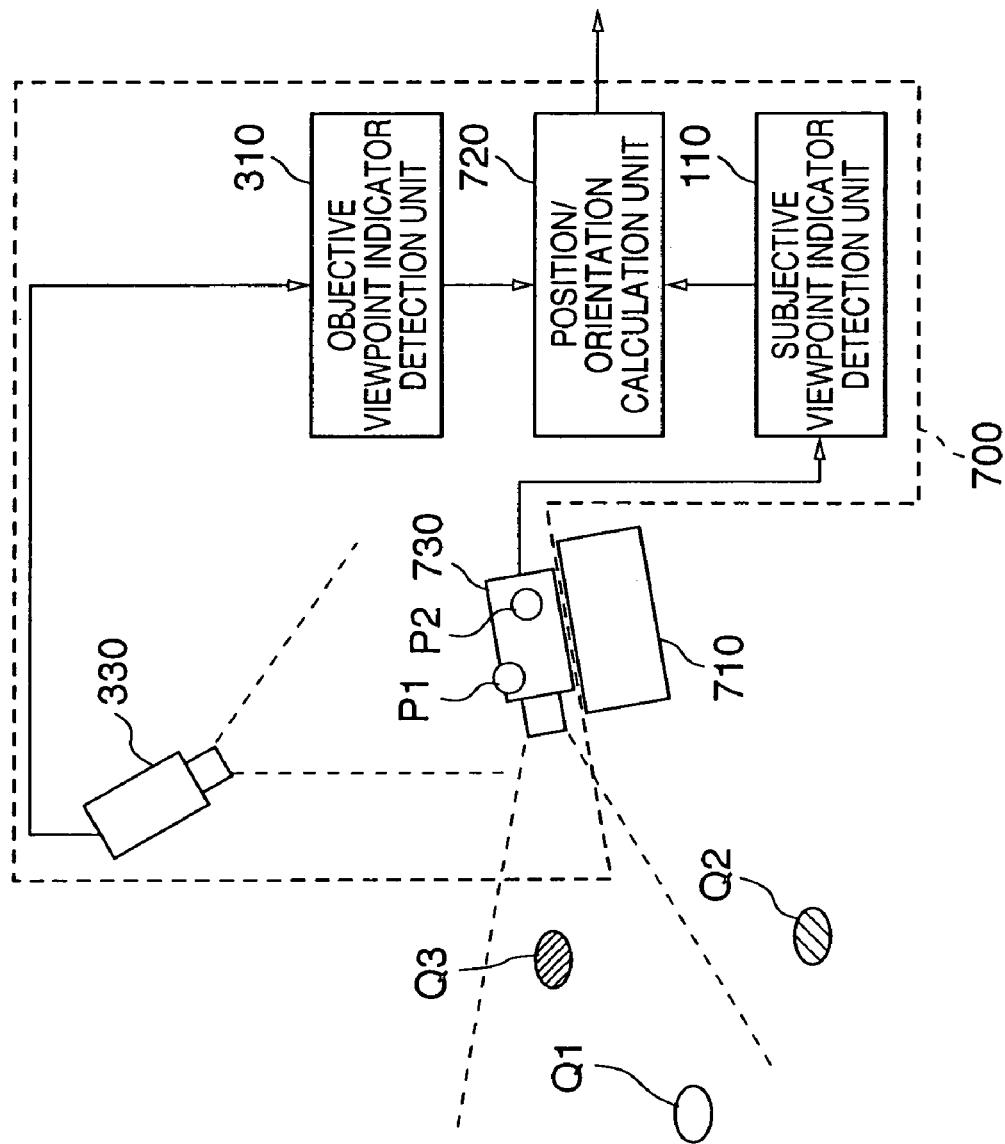
FIG. 7 is a schematic diagram showing the arrangement of a position/orientation measurement apparatus according to the fourth embodiment of the present invention.

FIG. 7 shows the arrangement of the position/orientation measurement apparatus according to this embodiment. Note that the same reference numerals and symbols in FIG. 7 denote the same parts as those in FIGS. 1 and 3, and a description thereof will be omitted. As shown in FIG. 7, a position/orientation measurement apparatus 700 according to this embodiment comprises a subjective viewpoint indicator detection unit 110, objective viewpoint indicator detection unit 310, position/orientation calculation unit 720, objective viewpoint camera 330, and subjective viewpoint camera 730.

The subjective viewpoint camera 730 is fixed to an object 710 to be measured. Assume that the position and orientation of the object 710 to be measured on a subjective viewpoint camera coordinate system (a coordinate system specified by defining one point on the subjective viewpoint camera 730 as an origin, and defining three orthogonal axes as X-, Y-, and Z-axes) are known.

At a plurality of positions on a real space, a plurality of subjective viewpoint indicators $Q^k$(k=1, . . . , $K_1$) whose positions on the world coordinate system are known are set as indicators to be captured by the subjective viewpoint camera 730. Also, at a plurality of positions on the subjective viewpoint camera 730, objective viewpoint indicators $P^k$ (k=1, . . . , $K_2$) whose positions on the subjective viewpoint camera coordinate system are known are set.

These indicators are preferably set so that the total number of subjective viewpoint indicators observed on an image captured by the subjective viewpoint camera 730, and objective viewpoint indicators observed on an image captured by the objective viewpoint camera 330 is always at least three when the object 710 to be measured is located at respective points within the measurement range in which the position and orientation are to be measured.

Since the functions of the objective viewpoint camera 330, subjective viewpoint indicator detection unit 110, and objective viewpoint indicator detection unit 310 are the same as those in the first embodiment, a detailed description thereof will be omitted. However, unlike in the first embodiment, an image captured by the subjective viewpoint camera 730 is input to the subjective viewpoint indicator detection unit 110 as a subjective viewpoint image.

The position/orientation calculation unit 720 calculates the position and orientation of the subjective viewpoint camera 730 on the world coordinate system as an unknown vector s by the same process as that of the position/orientation calculation unit 320 in the first embodiment shown in FIG. 4.

Furthermore, the position/orientation calculation unit 720 calculates the position and orientation of the object 710 to be measured on the world coordinate system as the product of coordinate conversion matrices on the basis of the calculated position and orientation of the subjective viewpoint camera 730 on the world coordinate system, and the position and orientation of the object 710 to be measured on the subjective viewpoint camera coordinate system as known values. Then, the unit 720 outputs the calculated position and orientation of the object 710.

With the above process, both the position and orientation of an arbitrary object to be measured can be measured with high precision.

Note that the subjective viewpoint indicator detection unit 110, objective viewpoint indicator detection unit 310, and position/orientation calculation unit 720 shown in FIG. 7 may be handled as independent devices, or their functions may be implemented by installing them as software programs in one or a plurality of computers and executing these programs by a CPU of each computer. In this embodiment, the respective units (subjective viewpoint indicator detection unit 110, objective viewpoint indicator detection unit 310, and position/orientation calculation unit 720) are handled as software programs which can run on a single computer. The basic arrangement of this computer is that shown in FIG. 10.

Also, in a description of this embodiment, all pieces of known information are saved in the external storage device 1007.

Note that the position/orientation calculation unit 720 of this embodiment calculates the position and orientation of the subjective viewpoint camera 730 as the state vector s. Alternatively, the unit 720 may directly calculate the position and orientation of the object 710 to be measured as the state vector s. In this case, equation (2) used to calculate the subjective viewpoint camera coordinate $x_C^{Q_{kn}}$ of the subjective viewpoint indicator from s, and equation (12) used to calculate the coordinate $x_B^{P_{km}}$ of the objective viewpoint indicator on the objective viewpoint camera coordinate system can be respectively replaced by:

$$x_C^{Q_{kn}} = M_{CO} \cdot M_{WO}(s)^{-1} \cdot x_W^{Q_{kn}} \qquad (19)$$

$$x_B^{P_{km}} = M_{WB}^{-1} \cdot M_{WO}(s) \cdot M_{CO}^{-1} \cdot x_C^{P_{km}} \qquad (20)$$

where $M_{CO}$ is a conversion matrix from a measurement object coordinate system (a coordinate system specified by defining one point on the object 710 to be measured as an origin, and defining three orthogonal axes as the X-, Y-, and Z-axes) to the subjective viewpoint camera coordinate system, and is calculated in advance on the basis of the position and orientation of the object 710 to be measured on the subjective viewpoint camera coordinate system, which are held in advance as known values. Also, $M_{WO}(s)$ is a modeling conversion matrix (i.e., a matrix for converting the coordinate on the object coordinate system into that on the world coordinate system) determined by s, and is defined by s as in equation (4).

[Fifth Embodiment]

In the first to fourth embodiments, each of the position/orientation calculation units 320, 520, 620, and 720 calculates s that minimizes the sum total of errors between the detected coordinates of the subjective and objective viewpoint indicators and the calculated values of these indicators to have the 6-valued state vector s indicating the position and orientation as an unknown value. However, the method of acquiring the position and orientation of an object to be measured by using geometric constraint conditions obtained from both the subjective and objective viewpoint images together is not limited to such specific method. A position/orientation measurement apparatus of this embodiment is characterized by having, as its building component, a position/orientation calculation unit that adopts a method different from the method of minimizing the total error.

The arrangement of the position/orientation measurement apparatus of this embodiment is basically the same as that of the first embodiment, except that the position/orientation calculation unit 320 is replaced by a position/orientation calculation unit 320' different from that of the first embodiment. The position/orientation measurement apparatus and position/orientation measurement method according to this embodiment will be described hereinafter.

In this embodiment, the respective units (objective-viewpoint indicator detection unit 310, position/orientation calculation unit 320', and subjective viewpoint indicator detection unit 110) are handled as software programs which can run on a single computer. The basic arrangement of this computer is that shown in FIG. 10. Also, in a description of this embodiment, all pieces of known information are saved in the external storage device 1007.

Figure 11:
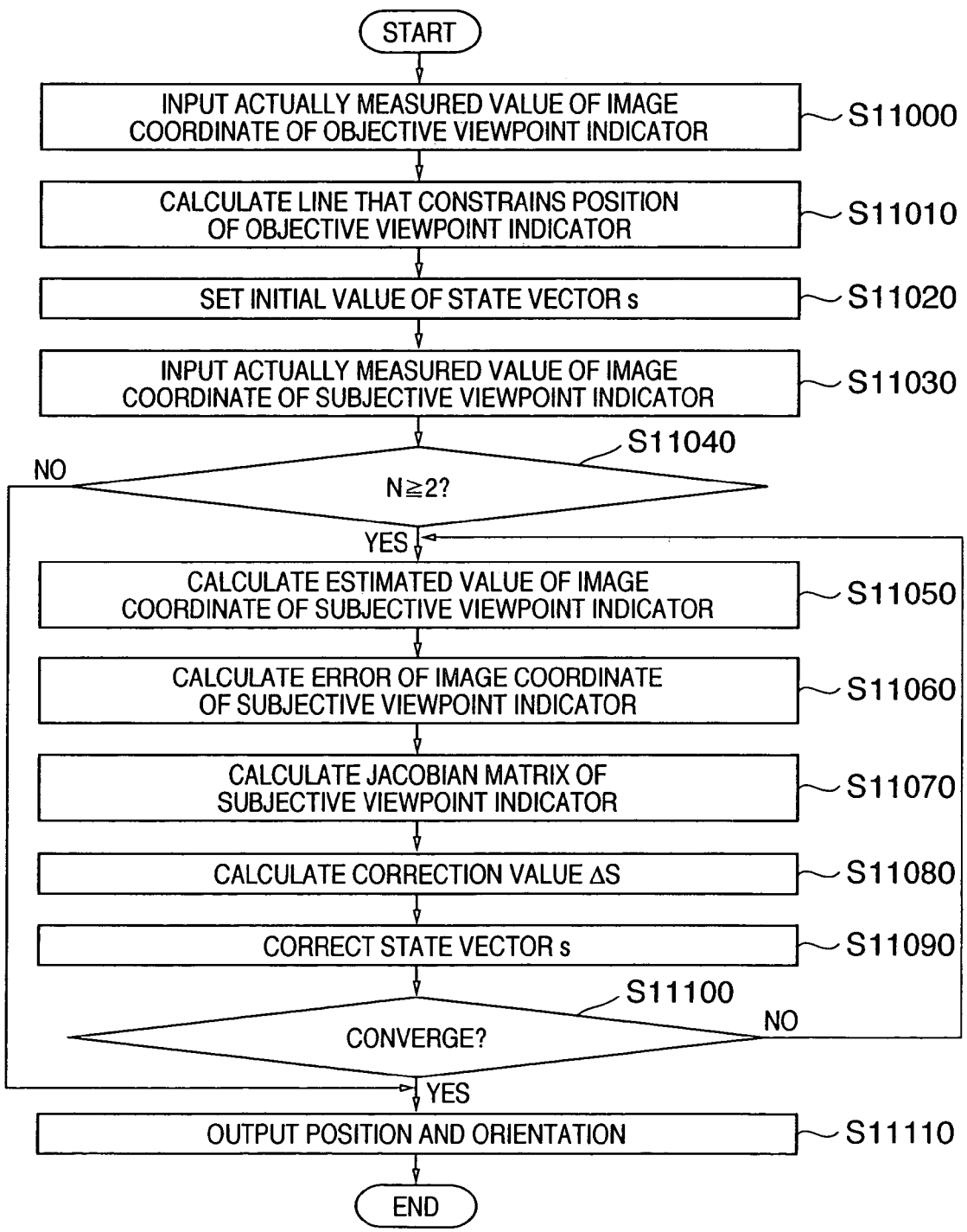
FIG. 11 is a flow chart showing the process for calculating parameters indicating the position-and orientation of an image sensing device 130, which is implemented when a CPU 1001 executes a software program of a position/orientation calculation unit 320'.

FIG. 11 is a flow chart showing the process for calculating parameters indicating the position and orientation of the image sensing device 130, which is implemented when the CPU 1001 executes a software program of the position/orientation calculation unit 320'. Assume that the software programs of the objective viewpoint indicator detection unit 310, position/orientation calculation unit 320', and subjective viewpoint indicator detection unit 110 have already been loaded onto the RAM 1002 prior to the following process.

In step S11000, the position/orientation calculation unit 320' receives image coordinates $u^{Pa}$ and $u^{Pb}$ of objective viewpoint indicators P detected by the objective viewpoint indicator detection unit 310. In this embodiment, only one objective viewpoint indicator is used in the subsequent process.

When the image coordinates of a plurality of objective viewpoint indicators are input (that is, when two or more objective viewpoint indicators are set on the image sensing device 130, and a plurality of these indicators are detected by the objective viewpoint indicator detection unit 310), the position/orientation calculation unit 320' selects an appropriate one point as an image coordinate $u^P$ of the objective viewpoint indicator P.

In step S11010, the position/orientation calculation unit 320' calculates parameters which express one line that constrains the position of the objective viewpoint indicator P on the world coordinate system, on the basis of the image coordinate $u^P$. That is, the unit 320' calculates slop components (direction vector) hx, hy, and hz of the line on the world coordinate system on the basis of the image coordinate $u^P$ by:

$$\begin{bmatrix} h_x \\ h_y \\ h_z \\ 0 \end{bmatrix} = M_{WB} \cdot \begin{bmatrix} u_x^P / f_x^B \\ u_y^P / f_y^B \\ 1 \\ 0 \end{bmatrix} \quad (21)$$

where $f^B_x$ and $f^B_y$ are the focal lengths of the objective viewpoint camera 330 in the x- and y-axis directions, and are held in advance in the external storage device 1007 as known values. The unit 320' sets the calculated components hx, hy, and hz as parameters of the line. At this time, a point on the line on the world coordinate system can be expressed as a function of a parameter τ by:

$$l_W(\tau) = \begin{bmatrix} h_x \tau + x_{WB} \\ h_y \tau + y_{WB} \\ h_z \tau + z_{WB} \\ 1 \end{bmatrix} \quad (22)$$

where $x_{WB}$, $y_{WB}$, and $z_{WB}$ define the position of the objective viewpoint camera 330 on the world coordinate system, and are held in advance as known values in the external storage device 1007.

Therefore, the line given by equation (22) passes the position of the objective viewpoint camera 330 on the world coordinate system, and that of the objective viewpoint indicator P on the world coordinate system, and the position of the objective viewpoint indicator P on the world coordinate system is obtained when the parameter τ assumes an appropriate value.

In the following description, unknown parameters to be calculated are described by a 4-valued state vector $s=[\tau\ \xi\ \psi\ \zeta]^T$ as a combination of the parameter τ that defines the position of the objective viewpoint indicator P on the world coordinate system, and three values (ξ, ψ, ζ) that represent the orientation of the image sensing device 130.

In step S11020, the position/orientation calculation unit 320' sets an appropriate initial value in the state vector s. For example, s derived in the process of the previous frame (time $t_{k-1}$) may be used as the initial value, or a value predicted based on a change in derived value from old "s"s may be set.

In step S11030, the position/orientation calculation unit 320' receives the image coordinates $u^{Qkn}$ and identifiers $k_n$ of the respective subjective viewpoint indicators $Q^{kn}$ detected by the subjective viewpoint indicator detection unit 110.

The position/orientation calculation unit 320' checks in step S11040 if the number of input subjective viewpoint indicators is two or more. If the total number N of indicators is less than 2, the flow jumps to step S11110 while skipping an update process of s implemented in steps S11050 to S11100.

In step S11050, the position/orientation calculation unit 320' calculates estimated values $u^{Qkn*}$ of the image coordinates of the respective subjective viewpoint indicators $Q^{kn}$ on the basis of equations (1) to (4). However, in this embodiment, since x, y, and z (which represent the position of the image sensing device 130 on the world coordinate system) in equation (4) are not included as elements of s, the unit 320' calculates these values based on s by:

$$[x\ y\ z\ 1]^T = l_W(\tau) - R_{WC}(s) \cdot x_C^P \quad (23)$$

where $x_C^P$ is the coordinate value of the indicator P on the subjective viewpoint camera coordinate system, and is held in advance as known information in the external storage device 1007. Also, $R_{WC}(s)$ is a rotation matrix which represents the orientation of the image sensing device 130 on the world coordinate system, and is defined based on s by:

$$R_{WC}(s) = \begin{bmatrix} \frac{\xi^2}{\theta^2}(1-\cos\theta) + \cos\theta & \frac{\xi\psi}{\theta^2}(1-\cos\theta) - \frac{\zeta}{\theta}\sin\theta & \frac{\xi\zeta}{\theta^2}(1-\cos\theta) + \frac{\psi}{\theta}\sin\theta & 0 \\ \frac{\psi\xi}{\theta^2}(1-\cos\theta) + \frac{\zeta}{\theta}\sin\theta & \frac{\psi^2}{\theta^2}(1-\cos\theta) + \cos\theta & \frac{\psi\zeta}{\theta^2}(1-\cos\theta) - \frac{\xi}{\theta}\sin\theta & 0 \\ \frac{\zeta\xi}{\theta^2}(1-\cos\theta) - \frac{\psi}{\theta}\sin\theta & \frac{\zeta\psi}{\theta^2}(1-\cos\theta) + \frac{\xi}{\theta}\sin\theta & \frac{\zeta^2}{\theta^2}(1-\cos\theta) + \cos\theta & 0 \\ 0 & 0 & 0 & 1 \end{bmatrix} \quad (24)$$

That is, in step S11050 under the assumption that the position and orientation of the image sensing device 130 follow the previously calculated state vector s, the estimated values of the image coordinates of the respective subjective viewpoint indicators are calculated in accordance with the position/orientation relationship between the image sensing device 130 and subjective viewpoint indicators.

In step S11060, the position/orientation calculation unit 320' calculates an error $\Delta u^{Qkn}$ between the estimated value $u^{Qkn*}$ and actually measured value $u^{Qkn}$ of the image coordinate of each subjective viewpoint indicator $Q^{kn}$ on the basis of equation (5).

In step S11070, the position/orientation calculation unit 320' calculates, for each subjective viewpoint indicator $Q^{kn}$, a 2×3 Jacobian matrix $J_{us}^{Qkn}$ ($=\partial u/\partial s$) having, as elements, solutions obtained by partially differentiating the function $F_C(\ )$ given by equation (1) by respective elements of s. More specifically, the unit 320' calculates a 3×4 Jacobian matrix $J_{xs}^{Qkn}(=\partial x/\partial s)$ having, as elements, solutions obtained by partially differentiating the right-hand side of equation (2) by elements of the vector s, and a 2×3 Jacobian matrix $J_{ux}^{Qkn}(=\partial u/\partial x)$ having, as elements, solutions obtained by partially differentiating the right-hand side of equation (3) by elements of the camera coordinate $x_C^{Qkn}$, and then calculates $J_{us}^{Qkn}$ by equation (6).

In step S11080, the position/orientation calculation unit 320' defines a (2N)-dimensional error vector U by equation (7), and a matrix Φ (2N×4) by equation (8), and calculates a correction value Δs of the state vector s by equation (9).

In step S11090, the position/orientation calculation unit 320' corrects the state vector s using the correction value Δs calculated in step S11080 by equation (10), and sets the corrected value as a new estimated value of s.

The position/orientation calculation unit 320' determines in step S11100 whether or not the calculation converges, using some determination criteria, i.e., whether or not error vector U is smaller than a predetermined threshold value, whether or not the correction value Δs is smaller than a predetermined threshold value, and so forth. If the calculation does not converge, the unit 320' repeats the process in step S11050 and subsequent steps using the corrected state vector s.

In step S11110, the position/orientation calculation unit 320' outputs the information of the position and orientation of the image sensing device 130. The information of the position and orientation is output in the form of, e.g., a modeling conversion matrix calculated from s. Note that the position of the image sensing device 130 on the world coordinate system may be calculated from the obtained s on the basis of equation (23), and may be output as 6-valued data indicating the position and orientation together with three values which are included in s and indicate the orientation, or may be output after the orientation is converted into an Euler angle. In addition, the information of the position and orientation described by various other position/orientation description methods may be output.

With the above process, the position and orientation of the image sensing device 130 which can minimize errors of the subjective viewpoint indicators on the subjective viewpoint image can be obtained under the constraint condition that uses the line on which the objective viewpoint indicator obtained from the objective viewpoint camera 330 is to be located.

The position and orientation measurement results of this embodiment are obtained while preferentially relying on information obtained from the objective viewpoint camera 330 compared to those of the first embodiment. Therefore, the position/orientation measurement apparatus according to this embodiment functions more effectively than the first embodiment in a situation that the reliability of the information obtained from the objective viewpoint camera 330 is relatively higher than that obtained from the image sensing device 130, e.g., when a high-resolution objective viewpoint camera can be used, when a marker with very high detection precision can be used as only an objective viewpoint indicator, and so forth.

[Sixth Embodiment]

A position/orientation measurement apparatus according to this embodiment has an arrangement in which another objective viewpoint camera is added to the position/orientation measurement apparatus of the fifth embodiment, and a position/orientation calculation unit 820 that outputs the information of the position and orientation of the image sensing device 130 by a process different from that of the position/orientation calculation unit 320' is used in place of the position/orientation calculation unit 320'.

The position/orientation measurement apparatus and position/orientation measurement method according to this embodiment will be described hereinafter.

Figure 8:
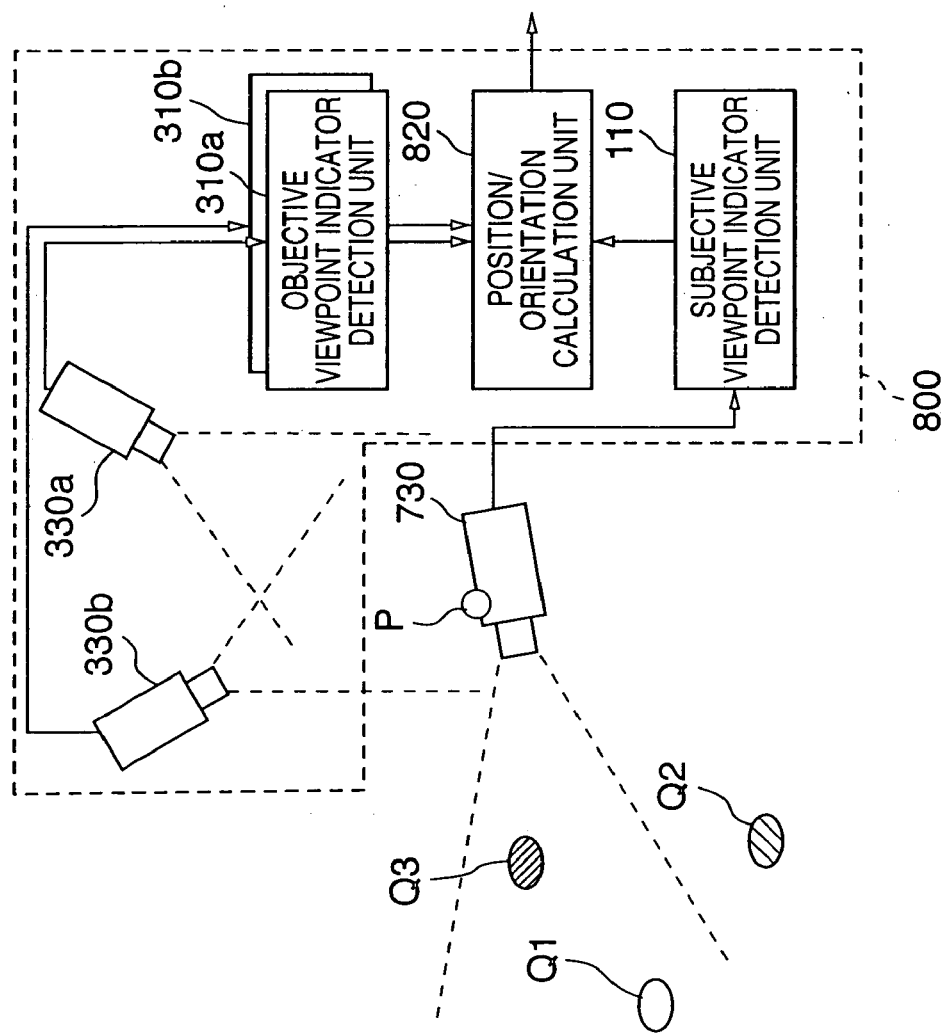
FIG. 8 is a schematic diagram showing the arrangement of a position/orientation measurement apparatus according to the sixth embodiment of the present invention.

FIG. 8 shows the arrangement of the position/orientation measurement apparatus according to this embodiment. Note that the same reference numerals and symbols in FIG. 8 denote the same parts as those in FIGS. 1 and 3, and a description thereof will be omitted. As shown in FIG. 8, a position/orientation measurement apparatus 800 according to this embodiment comprises objective viewpoint cameras 330a and 330b, a subjective viewpoint indicator detection unit 110, objective viewpoint indicator detection units 310a and 310b, and a position/orientation calculation unit 820, and is connected to an image sensing device 130 as an object to be measured.

On the image sensing device 130, an objective viewpoint indicator P whose position on the objective viewpoint camera coordinate system is known is set. This indicator is preferably set so that it is always observed on images respectively captured by the objective viewpoint cameras 330a and 330b when the image sensing device 130 is located at respective points within the measurement range in which the position and orientation are to be measured.

The objective viewpoint cameras 330a and 330b are fixed at positions at which they can always capture the objective viewpoint indicator P when the image sensing device 130 is located within the measurement range. Assume that the positions and orientations of the objective viewpoint cameras 330a and 330b on the world coordinate system are held in advance as known values.

At a plurality of positions on the real space, a plurality of subjective viewpoint indicators $Q^k$ are set as in the first embodiment. These indicators are preferably set so that the total number N of indicators observed on an image captured by the image sensing device 130 is always at least two when the image sensing device 130 is located at respective points within the measurement range in which the position and orientation are to be measured. In the example of FIG. 8, three subjective viewpoint indicators $Q^1$, $Q^2$, and $Q^3$ are set, and two subjective viewpoint indicators $Q^1$ and $Q^3$ of them are included in the field of view of the image sensing device 130.

The objective viewpoint indicator detection unit 310a receives an objective viewpoint image captured by the objective viewpoint camera 330a, detects the image coordinate of the objective viewpoint indicator P by the same process as in the prior art, and outputs its image coordinate $u^{Pa}$ and to the position/orientation calculation unit 820. Likewise, the objective viewpoint indicator detection unit 310b receives an objective viewpoint image captured by the objective viewpoint camera 330b, detects the image coordinate of the objective viewpoint indicator P by the same process as in the prior art, and outputs its image coordinate $u^{Pb}$ and to the position/orientation calculation unit 820.

The position/orientation calculation unit 820 calculates the position and orientation of the image sensing device 130 using the image coordinates $u^{Qkn}$ of the subjective viewpoint indicators $Q^{kn}$ and the image coordinates $u^{Pa}$ and $u^{Pb}$ of the objective viewpoint indicator P as inputs, and outputs the calculated position and orientation.

Note that the subjective viewpoint indicator detection unit 110, objective viewpoint indicator detection units 310a and 310b, and position/orientation calculation unit 820 shown in FIG. 8 may be handled as independent devices, or their functions may be implemented by installing them as software programs in one or a plurality of computers and executing these programs by a CPU of each computer. In this embodiment, the respective units (subjective viewpoint indicator detection unit 110, objective viewpoint indicator detection units 310a and 310b, and position/orientation calculation unit 820) are handled as software programs which can run on a single computer. The basic arrangement of this computer is that shown in FIG. 10.

Also, in a description of this embodiment, all pieces of known information are saved in the external storage device 1007.

Figure 9:
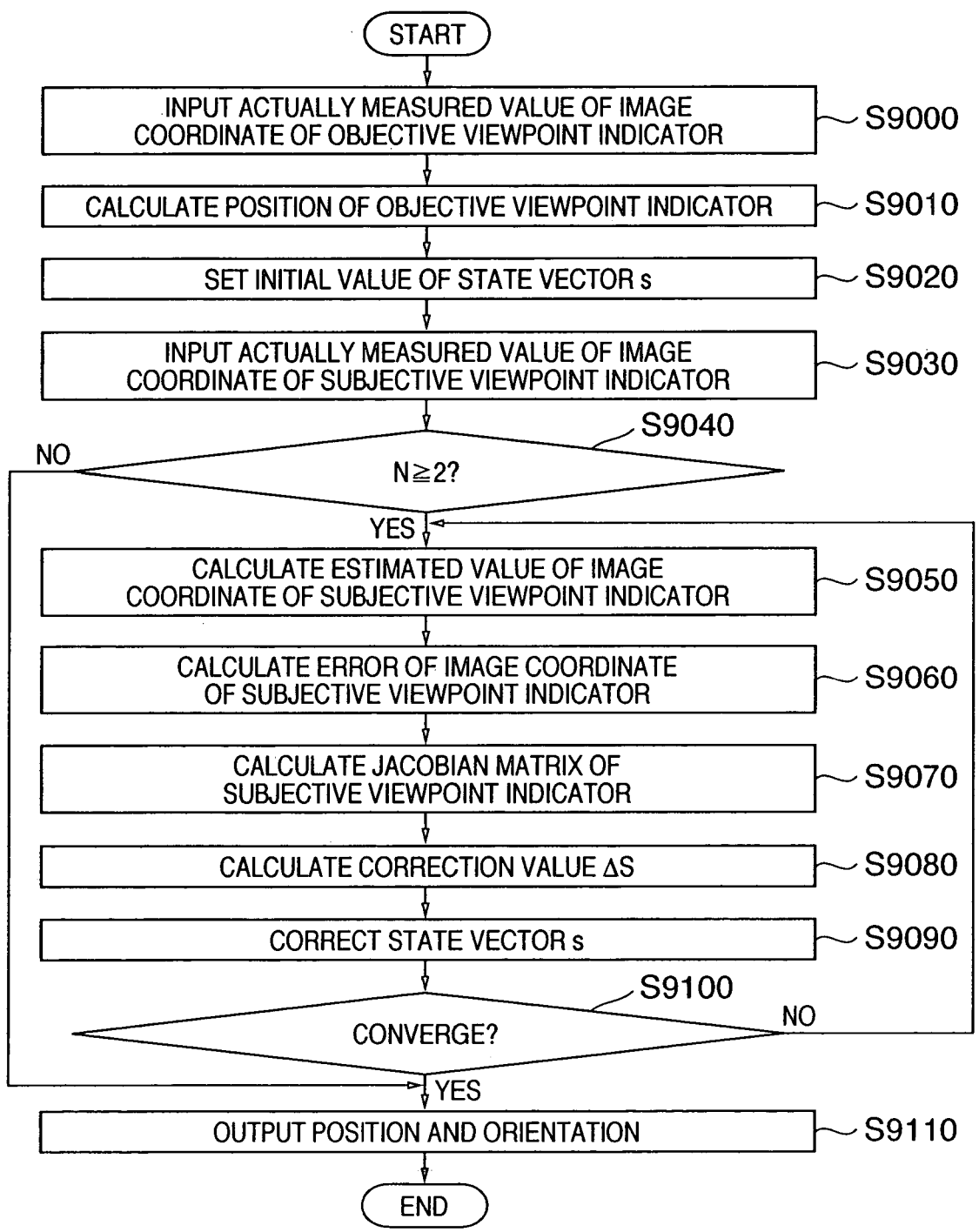
FIG. 9 is a flow chart showing the process for calculating parameters indicating the position and orientation of an image sensing device 130, which is implemented when a CPU 1001 executes a software program of a position/orientation calculation unit 820.

FIG. 9 is a flow chart showing the process for calculating parameters indicating the position and orientation of the image sensing device 130, which is implemented when the CPU 1001 executes a software program of the position/orientation calculation unit 820. Assume that the software programs of the subjective viewpoint indicator detection unit 110, objective viewpoint indicator detection units 310a and 310b, and position/orientation calculation unit 820 have already been loaded-onto the RAM 1002 prior to the following process.

In step S9000, the position/orientation calculation unit 820 receives the image coordinates $u^{Pa}$ and $u^{Pb}$ of the objective viewpoint indicator P detected by the objective viewpoint indicator detection units 310a and 310b.

In step S9010, the position/orientation calculation unit 820 calculates a position $x_W^P$ of the objective viewpoint indicator P using the image coordinates $u^{Pa}$ and $u^{Pb}$ on the basis of the principle of triangulation.

In the following description, unknown parameters to be calculated are described by a 3-valued state vector $s=[\xi \ \psi \ \zeta]^T$ that represents the orientation to be calculated of the image sensing device 130.

In step S9020, the position/orientation calculation unit 820 sets an appropriate initial value (estimated value of the orientation) in the state vector s. For example, s derived in the process of the previous frame (time $t_{k-1}$) may be used as the initial value, or a value predicted based on a change in derived value from old "s"s may be set.

In step S9030, the position/orientation calculation unit 820 receives the image coordinates $u^{Qkn}$ and identifiers $k_n$ of the respective subjective viewpoint indicators $Q^{kn}$ detected by the subjective viewpoint indicator detection unit 110.

The position/orientation calculation unit 820 checks in step S9040 if the number of input subjective viewpoint indicators is two or more. If the total number N of indicators is less than 2, the flow jumps to step S9110 while skipping an update process of s implemented in steps S9050 to S9100.

In step S9050, the position/orientation calculation unit 820 calculates estimated values $u^{Qkn*}$ of the image coordinates of the respective subjective viewpoint indicators $Q^{kn}$ on the basis of equations (1) to (4). However, in this embodiment, since x, y, and z (which represent the position of the image sensing device 130 on the world coordinate system) in equation (4) are not included as elements of s, the unit 820 calculates these values based on s by:

$$[x \ y \ z \ 1]^T = x_W^P - R_{WC}(s) \cdot x_C^P \quad (25)$$

where $x_W^P$ is the position of the objective viewpoint indicator P on the world coordinate system, which is calculated in step S9010, and $x_C^P$ is the position of the objective viewpoint indicator P on the subjective viewpoint camera coordinate system as a known value. Also, $R_{WC}(s)$ is a rotation matrix which represents the orientation of the image sensing device 130 on the world coordinate system, and is defined by equation (24).

In step S9060, the position/orientation calculation unit 820 calculates an error $\Delta u^{Qkn}$ between the estimated value $u^{Qkn*}$ and actually measured value $u^{Qkn}$ of the image coordinate of each subjective viewpoint indicator $Q^{kn}$ on the basis of equation (5).

In step S9070, the position/orientation calculation unit 820 calculates, for each subjective viewpoint indicator $Q^{kn}$, a 2×3 Jacobian matrix $J_{us}^{Qkn} (=\partial u/\partial s)$ having, as elements, solutions obtained by partially differentiating the function $F_C()$ given by equation (1) by respective elements of s. More specifically, the unit 820 calculates a 2×3 Jacobian matrix $J_{ux}^{Qkn} (=\partial u/\partial x)$ having, as elements, solutions obtained by partially differentiating the right-hand side of equation (3) by elements of the camera coordinate $x_C^{Qkn}$, and a 3×3 Jacobian matrix $J_{xs}^{Qkn} (=\partial x/\partial s)$ having, as elements, solutions obtained by partially differentiating the right-hand side of equation (2) by elements of the vector s, and then calculates $J_{us}^{Qkn}$ by equation (6).

In step S9080, the position/orientation calculation unit 820 defines a (2N)-dimensional error vector U by equation (7), and a matrix Φ (2N×3) by equation (8), and calculates a correction value Δs of the state vector s by equation (9).

In step S9090, the position/orientation calculation unit 820 corrects the state vector s using the correction value Δs calculated in step S9080 by equation (10), and sets the corrected value as a new estimated value of s.

The position/orientation calculation unit 820 determines in step S9100 whether or not the calculation converges, using some determination criteria, i.e., whether or not error vector U is smaller than a predetermined threshold value, whether or not the correction value Δs is smaller than a predetermined threshold value, and so forth. If the calculation does not converge, the unit 820 repeats the process in step S9050 and subsequent steps using the corrected state vector s.

In step S9110, the position/orientation calculation unit 820 outputs the information of the position and orientation of the image sensing device 130. The information of the position and orientation is output in the form of, e.g., a modeling conversion matrix calculated from s. Note that the position of the image sensing device 130 on the world coordinate system may be calculated from the obtained s on the basis of equation (25), and may be output as 6-valued data together with s it self that indicates the orientation, or may be output after the orientation is converted into an Euler angle. In addition, the information of the position and orientation described by various other position/orientation description methods may be output.

With the above process, the position and orientation of the image sensing device 130 which can minimize errors of the subjective viewpoint indicators on the subjective viewpoint image can be obtained under the constraint condition that uses the positions of the objective viewpoint cameras 330a and 330b. Therefore, as in the fifth embodiment, the position/orientation measurement apparatus according to this embodiment functions more effectively than the first embodiment in a situation that the reliability of the information obtained from the objective viewpoint camera 330 is relatively higher than that obtained from the image sensing device 130, e.g., when a high-resolution objective viewpoint camera can be used, when a marker with very high detection precision can be used as only an objective viewpoint indicator, and so forth.

[Seventh Embodiment]

In the sixth embodiment, the world coordinate $x_W^P$ of the objective viewpoint indicator P is calculated based on the outputs from the two objective viewpoint cameras. However, other arbitrary means may be used in place of the objective viewpoint cameras in the sixth embodiment as long as they can measure a three-dimensional (3D) position of an arbitrary measurement point. The position/orientation measurement apparatus and position/orientation measurement method according to this embodiment will be described hereinafter.

Figure 12:
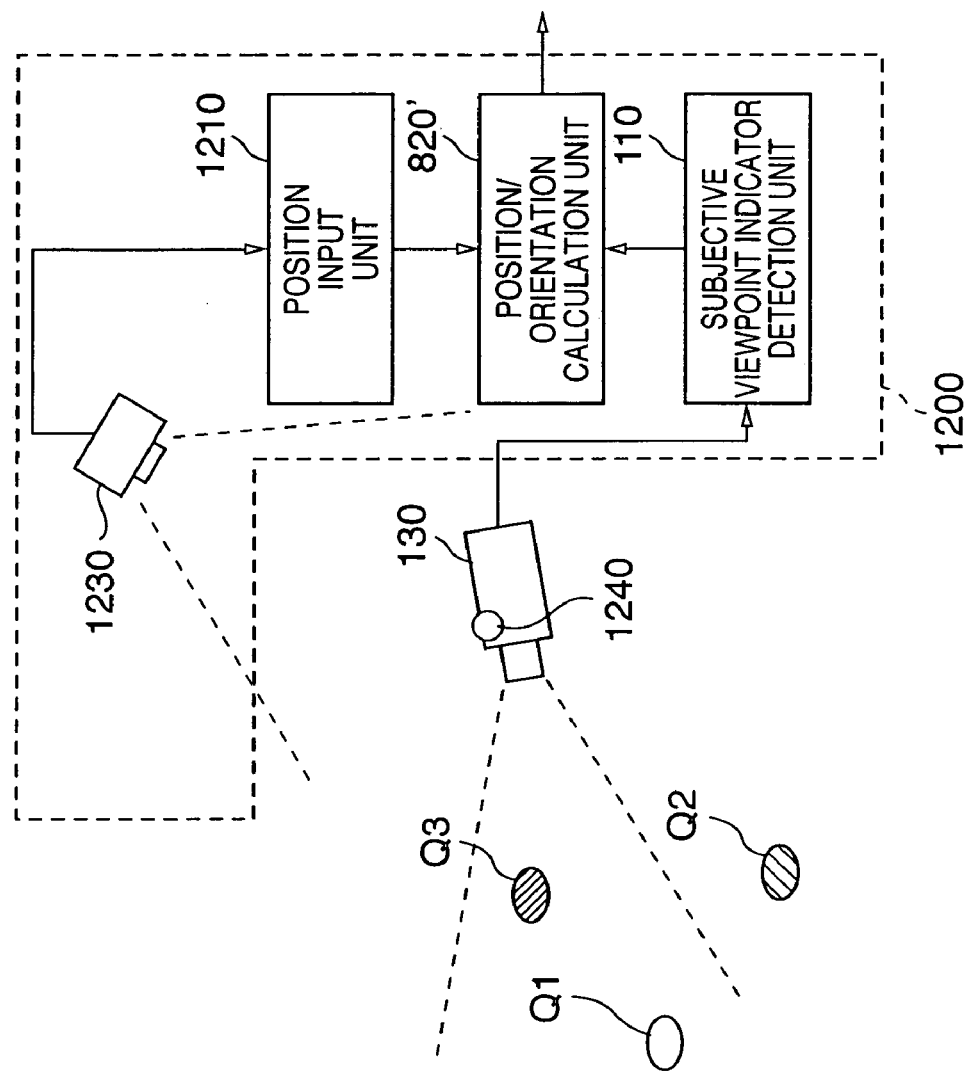
FIG. 12 is a schematic diagram showing the arrangement of a position/orientation measurement apparatus according to the seventh embodiment of the present invention.

FIG. 12 shows the arrangement of the position/orientation measurement apparatus according to this embodiment. Note that the same reference numerals and symbols in FIG. 12 denote the same parts as those in FIG. 8, and a description thereof will be omitted. As shown in FIG. 12, a position/orientation measurement apparatus 1200 according to this embodiment comprises a subjective viewpoint indicator detection unit 110, position sensor 1230, measurement point 1240, position input unit 1210, and position/orientation calculation unit 820', and is connected to an image sensing device 130 as an object to be measured.

The position sensor 1230 measures the 3D position of a predetermined measurement point, and comprises, e.g., OPTOTRAK available from Northern Digital Inc. as an optical 3D position sensor.

The measurement point 1240 is a point to be measured by the position sensor 1230, and comprises an infrared LED that flashes in accordance with a control signal from the position sensor 1230. The measurement point 1240 is attached to the image sensing device 130 in place of the objective viewpoint indicator P in the sixth embodiment. The measurement point 1240 is preferably set to always be included in the measurement range of the position sensor 1230 when the image sensing device 130 is located at respective points within the measurement range in which the position and orientation are to be measured. Also, the position of the measurement point 1240 on the subjective viewpoint camera coordinate system is stored in the external storage device 1007 as known data, and is read out onto the RAM 1002 when it is used, as needed.

The position input unit 1210 receives the 3D coordinate of the measurement point 1240 output from the position sensor 1230, and outputs it to the position/orientation calculation unit 820'. When the 3D coordinate of the measurement point 1240 output from the position sensor 1230 is that on a sensor coordinate system defined by the position sensor 1230 itself, the position input unit 1210 converts the input coordinate into that on the world coordinate system, and then output the converted coordinate to the position/orientation calculation unit 820'. Coordinate conversion from the sensor coordinate system to the world coordinate system can be done by a known method if the position and orientation of the position sensor 1230 on the world coordinate system are given as known information. The position and orientation of the position sensor 1230 on the world coordinate system are stored as known information in the external storage device 1007, and are read out onto the RAM 1007 when they are used, as needed.

The position/orientation calculation unit 820' calculates the position and orientation of the image sensing device 130 using the 3D coordinate of the measurement point 1240 input from the position input unit 1210, and the image coordinates $u^{Qkn}$ of subjective viewpoint indicators $Q^{Kn}$ input from the subjective viewpoint indicator detection unit 110, and outputs them.

Note that the operation of the position/orientation calculation unit 820' is substantially the same as that of the position/orientation calculation unit 820 in the sixth embodiment. However, in place of the steps (steps S9000 and S9010) of making the position/orientation calculation unit 820 receive the image coordinates $u^{Pa}$ and $u^{Pb}$ of the objective viewpoint indicator P and calculate the position $x^{wP}$ of the objective viewpoint indicator P, the position/orientation calculation unit 820' has a step of receiving the position $x_W^P$ of the measurement point 1240 on the world coordinate system from the position input unit 1210. Also, unlike in the sixth embodiment, the position of the measurement point 1240 on the world coordinate system is used as $x_W^P$ in equation (25).

With the above process, the position and orientation of the image sensing device 130 which can minimize errors of the subjective viewpoint indicators on the subjective viewpoint image can be obtained under the constraint condition that uses the position of the measurement point 1240 obtained using the position sensor 1230. In this way, position & orientation measurement of the image sensing device 130, which can achieve both stability of the position precision obtained by use of the position sensor, and that of the alignment precision on an image obtained by use of the subjective viewpoint image, can be realized.

Note that any other sensors may be used as the position sensor 1230 as long as they can measure the 3D position of the measurement point. For example, an ultrasonic sensor that measures the 3D position of an ultrasonic beacon (e.g., IS-600 available from InterSense Inc.) may be used as the position sensor 1230. In this case, an ultrasonic beacon is attached to the image sensing device 130 as the measurement point 1240.

Note that this embodiment can also be applied to a case wherein the image sensing device 130 is mounted on an object to be measured to which the measurement point is attached, and the position and orientation of this object to be measured or the image sensing device 130 are to be measured, as can be seen from the above description. When the position and orientation of the image sensing device 130 are to be measured, the position/orientation relationship between the image sensing device 130 and the object to be measured must be measured and held in advance in a memory.

[Eighth Embodiment]

In the seventh embodiment, an optical sensor or ultrasonic sensor is used as the position sensor. However, for outdoor use, a GPS (Global Positioning System) can be used as the position sensor. The position/orientation measurement apparatus and position/orientation measurement method according to this embodiment measures will be described hereinafter.

Figure 13:
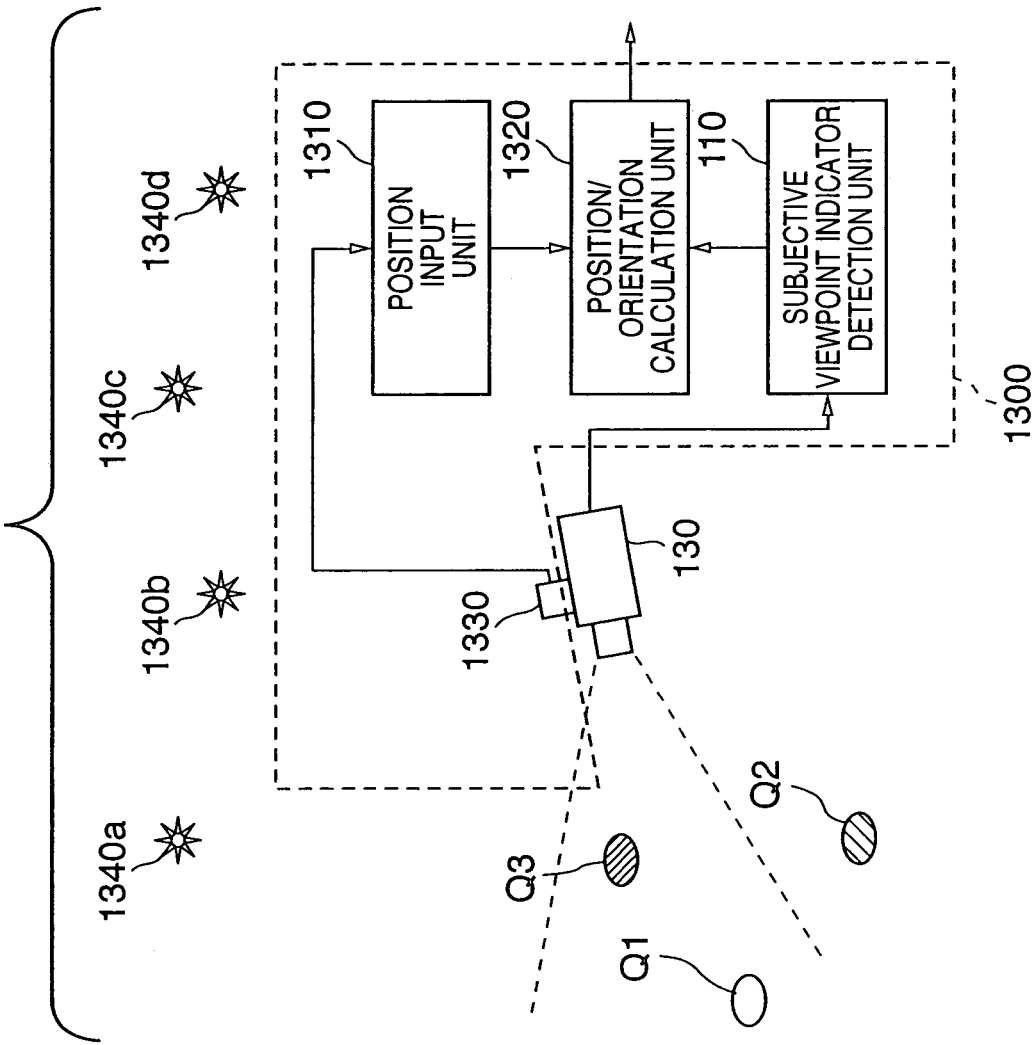
FIG. 13 is a schematic diagram showing the arrangement of a position/orientation measurement apparatus according to the eighth embodiment of the present invention.

FIG. 13 shows the arrangement of the position/orientation measurement apparatus according to this embodiment. Note that the same reference numerals and symbols in FIG. 13 denote the same parts as those in FIG. 12, and a description thereof will be omitted. As shown in FIG. 13, a position/ orientation measurement apparatus 1300 according to this embodiment comprises a subjective viewpoint indicator detection unit 110, GPS receiver 1330, position input unit 1310, and position/orientation calculation unit 1320, and is connected to an image sensing device 130 as an object to be measured.

The GPS receiver 1330 is mounted on the image sensing device 130. The GPS receiver 1330 measures its own position (latitude, longitude, and altitude) on the earth by receiving signals from GPS satellites 1340a to 1340d, and outputs the measured position to the position input unit 1310. However, when a sufficient number of GPS satellites cannot be seized, the measured values of only the latitude and longitude are often obtained. In such case, only the latitude and longitude are output. Assume that the position of the GPS receiver 1330 on the subjective viewpoint camera coordinate system is known.

The position input unit 1310 receives the latitude, longitude, and altitude output from the GPS receiver 1330, converts them into a 3D coordinate $(x^P, y^P, z^P)$ or two-dimensional (2D) coordinate $(x^P, y^P)$ on the world coordinate system by a known matrix conversion process, and outputs the converted position to the position/orientation calculation unit 1320.

The position/orientation calculation unit 1320 calculates the position and orientation of the image sensing device 130 using the 3D or 2D coordinate of the GPS receiver 1330 input from the position input unit 1310, and the image coordinates $u^{Qkn}$ of subjective viewpoint indicators $Q^{kn}$ input from the subjective viewpoint indicator detection unit 110, and outputs them.

When the 3D coordinate of the GPS receiver 1330 is obtained, the position/orientation calculation unit 1320 derives and outputs the position and orientation of the image sensing device 130 by the same process as that of the position/orientation calculation unit 820' in the sixth embodiment. On the other hand, when only the 2D coordinate of the GPS receiver 1330 is measured, the position/orientation calculation unit 1320 derives and outputs the position and orientation of the image sensing device 130 by the same process as that of the position/orientation calculation unit 820 in the fifth embodiment, i.e., the process of calculating, as unknown parameters, a 4-valued state vector $s=[\tau\ \xi\ \psi\ \zeta]^T$ as a combination of the parameter $\tau$ that represents the line which constrains the position of the measurement point (GPS receiver 1330 in this embodiment) on the world coordinate system, and three values ($\xi, \psi, \zeta$) that represent the orientation of the image sensing device 130. In this embodiment, the constraint formula of the line (an equation corresponding to equation (22) in the fifth embodiment) can be described by:

$$l_W(\tau) = \begin{bmatrix} x^P \\ y^P \\ \tau \\ 1 \end{bmatrix} \quad (26)$$

With the above process, the position and orientation of the image sensing device 130 which can minimize errors of the subjective viewpoint indicators on the subjective viewpoint image can be obtained under the constraint condition that uses the position obtained by the GPS receiver 1330.

When a state wherein the GPS receiver 1330 can output a 3D coordinate can always be expected, an arrangement without any process branch upon obtaining only a 2D coordinate can be adopted. If it is assumed that the height of the image sensing device 130 is always constant (for example, if the image sensing device 130 is a built-in camera of an HMD, and its height is assumed to be that of the user), a fixed value may be used as the position in the height direction without using the altitude information obtained from the GPS receiver 1330.

<Modification 1>

In each of the above embodiments, the correction value Δs of the state vector is calculated based on the error vector U and matrix Φ using the steepest descent method given by equation (9). However, the correction value Δs need not always be calculated by the steepest descent method. For example, the correction value may be calculated using the LM method (Levenberg-Marquardt method) as a known numerical calculation method. That is, the essence of the present invention does not impair if any other numerical calculation methods are applied.

<Modification 2>

In each of the above embodiments, a point feature, i.e., an image coordinate of one point that represents a projected image of an indicator, is used as a feature value associated with the image coordinate of the indicator. As the indicators Q and P, indicators from which such point feature can be extracted (to be referred to as point indicators hereinafter) are used. However, the above embodiments are not limited to the types of indicators, and the types of feature values associated with the image coordinates of indicators.

For example, markers having a specific geometric shape, which are used in a known position/orientation measurement apparatus (Takahashi, I. Ishii, H. Makino, and M. Nakashizuka, "A high accuracy realtime 3D measuring method of rectangular marker position/orientation for VR interface by monocular vision", 3D Image Conference '96, pp. 167–172, 1996) may be used as subjective viewpoint indicators and/or objective viewpoint indicators. When rectangular markers are used as indicators, the world coordinates of the respective vertices of a rectangle are held as known values, and the image coordinates of the respective vertices are detected from an image as feature values associated with the image coordinates of the indicators, thus obtaining the same effect as that of the indicators in the embodiments.

Alternatively, line features used in another known position/orientation measurement apparatus (e.g., see non-patent reference 2) are used as feature values associated with the image coordinates of indicators, and indicators from which such line features can be extracted (to be referred to as line indicators hereinafter) may be used as subjective viewpoint indicators and/or objective viewpoint indicators. For example, a distance of a line from an origin is used as a reference for evaluating an error, the error vector U is formed by errors Δd which are calculated based on detected values d from an image and estimated values d* from the state vector s, and the matrix Φ is formed by a 1×6 Jacobian matrix $J_{ds}$ ($=\partial d/\partial s$) having, as elements, solutions obtained by partially differentiating the calculation formula of d* by respective elements of the state vector s. In this way, the position and orientation may be measured by the same scheme as in the above embodiments. Of course, line and point indicators may be used together.

<Modification 3>

In the third to eighth embodiments, one image sensing device 130 or subjective viewpoint camera 730 is used.

However, a plurality of image sensing devices or subjective viewpoint cameras may be used as in the second embodiment.

<Modification 4>

In the fourth embodiment, the objective viewpoint indicator P is set on the subjective viewpoint camera 730. However, the layout position of the subjective viewpoint indicator P is not limited to such specific position, and the same effect can be obtained if the indicator P is set on the object 710 to be measured.

<Modification 5>

In the fifth to eighth embodiments, the positions of the objective viewpoint indicator, measurement point, and the GPS receiver are held as known values, and the differences from the position of the image sensing device 130 to be measured are considered. However, a simple arrangement that approximates these points to an identical point may be adopted.

Note that the essential feature lies in measurements of the position and orientation of the object to be measured by using geometric constraint conditions obtained from both the subjective and objective viewpoint images together, and the application range is not limited to the types of indicators, the use method of the constraint conditions, and the solution calculation method.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A position/orientation measurement method for calculating a position and orientation of an object, comprising:
    a subjective viewpoint image acquisition step of acquiring a first image obtained by capturing a scene by a subjective viewpoint image sensing unit attached to the object;
    an objective viewpoint image acquisition step of acquiring a second image obtained by capturing an image of the object by an objective viewpoint image sensing unit;
    a first detection step of detecting a feature value associated with an image coordinate of a first indicator arranged in the scene from the first image;
    a second detection step of detecting a feature value associated with an image coordinate of a second indicator arranged on the object or the objective viewpoint image sensing unit from the second image; and
    a position/orientation calculation step of calculating the position and orientation of the object using the feature value associated with the image coordinate of the first indicator detected in the first detection step and the feature value associated with the image coordinate of the second indicator detected in the second detection step.

2. The method according to claim 1, wherein the object is an image sensing device, which has the subjective viewpoint image sensing unit.

3. The method according to claim 1, wherein the objective viewpoint image sensing unit is fixed in the scene.

4. The method according to claim 1, wherein the objective viewpoint image sensing unit comprises a plurality of cameras.

5. The method according to claim 1, wherein the position/orientation calculation step comprises:
    an estimation step of estimating a feature value associated with the image coordinate of the first indicator in the first image, and a feature value associated with the image coordinate of the second indicator in the second image, on the basis of estimated values of the position and orientation of the object; and a correction step of correcting the estimated values of the position and orientation of the object to reduce errors between the feature values associated with the image coordinates of the first and second indicators detected in the first and second detection steps, and the feature values associated with the image coordinates of the first and second indicators estimated in the estimation step.

6. The method according to claim 1, wherein the feature value associated with the image coordinate of the first indicator includes an image coordinate or image coordinates of a plurality of points specified by the first indicator, and the feature value associated with the image coordinate of the second indicator includes an image coordinate or image coordinates of a plurality of points specified by the second indicator.

7. The method according to claim 6, wherein at least one indicator that allows to detect an image coordinate is set as each of the first and second indicators, and the total number of image coordinates detected in the first and second detection steps is not less than 3.

8. The method according to claim 6, wherein the position/orientation calculation step comprises:
a position calculation step of calculating information associated with the position of the object using the image coordinate of the second indicator detected in the second detection step; and
an orientation calculation step of calculating information associated with the orientation of the object using the image coordinate of the first indicator detected in the first detection step.

9. The method according to claim 8, wherein one indicator is set as the second indicator, and indicators which allow to detect not less than two image coordinates are set as the first indicator.

10. The method according to claim 1, wherein the feature value associated with the image coordinate of the second indicator detected in the second detection step is an image coordinate of the second indicator, and
the position/orientation calculation step includes a step of calculating a line that constrains a position of the second indicator on a three-dimensional space on the basis of the image coordinate of the second indicator detected in the second detection step and a position and orientation of the objective viewpoint image sensing unit, and calculating the position and orientation of the object on the basis of the feature value associated with the image coordinate of the first indicator detected in the first detection step under a constraint that the second indicator is present on the line.

11. The method according to claim 10, wherein the position/orientation calculation step includes a step of calculating the position and orientation of the object by calculating unknown values, which include a parameter that represents the position of the second indicator on the line and a parameter that represents the orientation of the object, on the basis of the feature value associated with the image coordinate of the first indicator detected in the first detection step.

12. A program for making a computer execute a position/orientation measurement method of claim 1.

13. A computer readable storage medium storing a program of claim 10.

14. A position/orientation measurement method of calculating a first position/orientation parameter of an object which is attached to a first image sensing unit used to capture an image of a real space, and has a known position/orientation relationship with the first image sensing unit, comprising:

a first image coordinate detection step of detecting an image coordinate of a first indicator arranged on the real space from a first image captured by the first image sensing unit;
a first estimated image coordinate detection step of calculating an estimated image coordinate of the first indicator in accordance with the position/orientation relationship between the first image sensing unit and the first indicator under an assumption that the position and orientation of the first image sensing unit follow a previously calculated second position/orientation parameter;
a first error coordinate calculation step of calculating a first error coordinate between the image coordinate detected in the first image coordinate detection step and the estimated image coordinate calculated in the first estimated image coordinate detection step on the first image;
a second image coordinate detection step of detecting an image coordinate of a second indicator arranged on the first image sensing unit or the object from a second image which is captured by a second image sensing unit and includes the object;
a second estimated image coordinate detection step of calculating an estimated image coordinate of the second indicator in accordance with the position/orientation relationship between the first image sensing unit and the second indicator under an assumption that the position and orientation of the first image sensing unit follow the previously calculated second position/orientation parameter;
a second error coordinate calculation step of calculating a second error coordinate between the image coordinate detected in the second image coordinate detection step and the estimated image coordinate calculated in the second estimated image coordinate detection step on the second image;
a correction value calculation step of calculating a correction value used to correct the previously calculated second position/orientation parameter using the first and second error coordinates;
a correction step of correcting the previously calculated second position/orientation parameter using the correction value; and
a parameter calculation step of calculating the first position/orientation parameter of the object, which has the known position/orientation relationship with the first image sensing unit, using the second position/orientation parameter corrected in the correction step.

15. The method according to claim 14, wherein the object is an image sensing device, which has the first image sensing unit.

16. A position/orientation measurement method of calculating a position and orientation of an image sensing device as an object to be measured, which captures an image of a scene, comprising:
a detection step of detecting a feature value associated with an image coordinate of a first indicator arranged in the scene from the image captured by the image sensing device;
a measurement step of measuring a three dimensional position of a second indicator arranged on the image sensing device; and
a position/orientation calculation step of calculating the position and orientation of the image sensing device using the feature value associated with the image coordinate of the first indicator detected in the detection step, and the three dimensional position of the second indicator measured in the measurement step.

17. A position/orientation measurement apparatus for calculating a position and orientation of an object, comprising:
- subjective image sensing unit, attached to the object, adapted to capture an image of a scene;
- objective viewpoint image sensing unit adapted to capture an image of the object;
- first detection unit adapted to detect a feature value associated with an image coordinate of a first indicator arranged in the scene from a first image captured by said subjective viewpoint image sensing unit;
- second detection unit adapted to detect a feature value associated with an image coordinate of a second indicator arranged on the object or said subjective viewpoint image sensing unit from a second image captured by said objective viewpoint image sensing unit; and
- position/orientation calculation unit adapted to calculate the position and orientation of the object using the feature value associated with the image coordinate of the first indicator detected by said first detection unit, and the feature value associated with the image coordinate of the second indicator detected by said second detection unit.

* * * * *

UNITED STATES PATENT AND TRADEMARK OFFICE
CERTIFICATE OF CORRECTION

PATENT NO. : 7,092,109 B2
APPLICATION NO. : 10/752487
DATED : August 15, 2006
INVENTOR(S) : Kiyohide Satoh et al.

It is certified that error appears in the above-identified patent and that said Letters Patent is hereby corrected as shown below:

[56] REFERENCES CITED:

U.S. PATENT DOCUMENTS, "2002/0103617 A1   8/2002   Uchlyama et al." should read --2002/0103617 A1   8/2002   Uchiyama et al.--.

[57] ABSTRACT:

Line 10, "other-hand," should read --other hand,--.

COLUMN 3:

Line 61,

"$$x_W^{Q_{k_n}} = \begin{bmatrix} x_C^{Q_{k_n}} & y_C^{Q_{k_n}} & z_C^{Q_{k_n}} & 1 \end{bmatrix} = M_{WC}(s)^{-1} \cdot x_W^{Q_{k_n}} \quad (2)$$"

should read $$--x_C^{Q_{k_n}} = \begin{bmatrix} x_C^{Q_{k_n}} & y_C^{Q_{k_n}} & z_C^{Q_{k_n}} & 1 \end{bmatrix}^T = M_{WC}(s)^{-1} \cdot x_W^{Q_{k_n}} \quad (2) --$$

UNITED STATES PATENT AND TRADEMARK OFFICE
CERTIFICATE OF CORRECTION

PATENT NO. : 7,092,109 B2
APPLICATION NO. : 10/752487
DATED : August 15, 2006
INVENTOR(S) : Kiyohide Satoh et al.

It is certified that error appears in the above-identified patent and that said Letters Patent is hereby corrected as shown below:

COLUMN 4:

Lines 21-31,

"
$$M_{MC}(s) = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta & x \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta & y \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta & z \\ 0 & 0 & 0 & 1 \end{bmatrix} \quad (4)$$
"

should read

--
$$M_{WC}(S) = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta & x \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta & y \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta & z \\ 0 & 0 & 0 & 1 \end{bmatrix} \quad (4)$$
--

UNITED STATES PATENT AND TRADEMARK OFFICE
CERTIFICATE OF CORRECTION

PATENT NO. : 7,092,109 B2
APPLICATION NO. : 10/752487
DATED : August 15, 2006
INVENTOR(S) : Kiyohide Satoh et al.

It is certified that error appears in the above-identified patent and that said Letters Patent is hereby corrected as shown below:

COLUMN 8:

Line 57, "position-and" should read --position and--.

COLUMN 12:

Line 29, "is-made" should read --is made--.
Line 67, "value." should read --values.--.

COLUMN 17:

Line 29, "objective:" should read --objective--.

COLUMN 18:

Line 16, "devices" should read --device--.

COLUMN 20:

Line 49, "(objective-view-" should read --(objective view--.

COLUMN 21:

Line 67, "objective." should read --objective--.

COLUMN 22:

Line 3, "the." should read --the--.

COLUMN 26:

Line 56, "it self" should read --itself--.

COLUMN 27:

Line 60, "output" should read --outputs--.

UNITED STATES PATENT AND TRADEMARK OFFICE
CERTIFICATE OF CORRECTION

PATENT NO.       : 7,092,109 B2
APPLICATION NO.  : 10/752487
DATED            : August 15, 2006
INVENTOR(S)      : Kiyohide Satoh et al.

It is certified that error appears in the above-identified patent and that said Letters Patent is hereby corrected as shown below:

<u>COLUMN 28</u>:

Line 61, "this" should read --these--.

<u>COLUMN 33</u>:

Line 61, "claim 10." should read --claim 12.--.

<u>COLUMN 35</u>:

Line 4, "subjective" should read --subjective viewpoint--.

Signed and Sealed this

Eighteenth Day of March, 2008

JON W. DUDAS
*Director of the United States Patent and Trademark Office*